United States Patent
Sandow

(10) Patent No.: US 12,027,076 B2
(45) Date of Patent: Jul. 2, 2024

(54) SMART SWATCH APPARATUS AND SYSTEMS

(71) Applicant: Material Technologies Corporation, Boca Raton, FL (US)

(72) Inventor: Adam I. Sandow, Boca Raton, FL (US)

(73) Assignee: MATERIAL TECHNOLOGIES CORPORATION, Boca Raton, FL (US)

( * ) Notice: Subject to any disclaimer, the term of this patent is extended or adjusted under 35 U.S.C. 154(b) by 830 days.

(21) Appl. No.: 16/856,114

(22) Filed: Apr. 23, 2020

(65) Prior Publication Data

US 2021/0090473 A1     Mar. 25, 2021

Related U.S. Application Data

(60) Provisional application No. 62/837,284, filed on Apr. 23, 2019.

(51) Int. Cl.
*G09F 5/00* (2006.01)
*G09F 9/30* (2006.01)

(52) U.S. Cl.
CPC . *G09F 5/00* (2013.01); *G09F 9/30* (2013.01)

(58) Field of Classification Search
CPC .............. G09F 5/00; G09F 9/30; G06F 21/86
See application file for complete search history.

(56) References Cited

U.S. PATENT DOCUMENTS

| 4,881,707 A | 11/1989 | Garfinkle |
|---|---|---|
| 2004/0123507 A1* | 7/2004 | Gentry ............... A47G 1/06 40/768 |
| 2009/0300960 A1* | 12/2009 | Broehl ............... A47G 1/06 40/721 |
| 2012/0127211 A1* | 5/2012 | Forster ............... G09F 15/02 345/660 |
| 2013/0311252 A1 | 11/2013 | Fernando et al. |
| 2021/0028532 A1* | 1/2021 | Lai ..................... H01Q 1/38 |

FOREIGN PATENT DOCUMENTS

| RU | 127988 | 5/2013 |
|---|---|---|
| RU | 56041 | 8/2016 |
| WO | WO-2020219621 A1 * | 10/2020 ............... G09F 5/00 |

* cited by examiner

*Primary Examiner* — Cassandra Davis
(74) *Attorney, Agent, or Firm* — DUANE MORRIS LLP; Gregory M. Lefkowitz; Joaquin Hernandez

(57) ABSTRACT

A swatch presentation system is disclosed. The swatch presentation system may include a plurality of layers with an opening in a first layer. The first opening of the first layer allows for the viewing of a swatch. The swatch presentation system may include a second layer, where a first surface of the second layer engages at least a portion of a first surface of the swatch. The first surface of the second layer and the opening of the first layer may form a cavity where the swatch is displayed. The second layer may be a frame. The swatch presentation system may also include a third layer, where a first surface of the third layer engages a second surface of the second layer. A second surface of the third layer may include an opening that may store a transmitter. The transmitter may transmit data identifying the swatch presentation system.

18 Claims, 23 Drawing Sheets

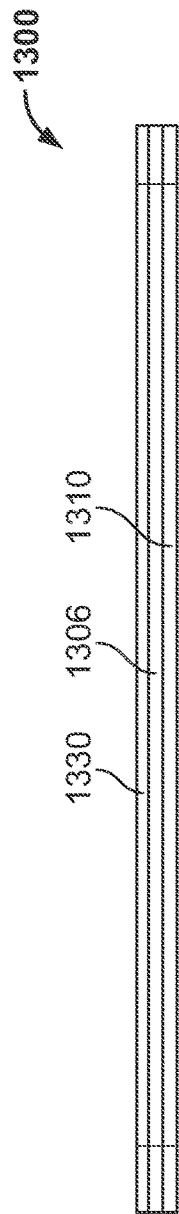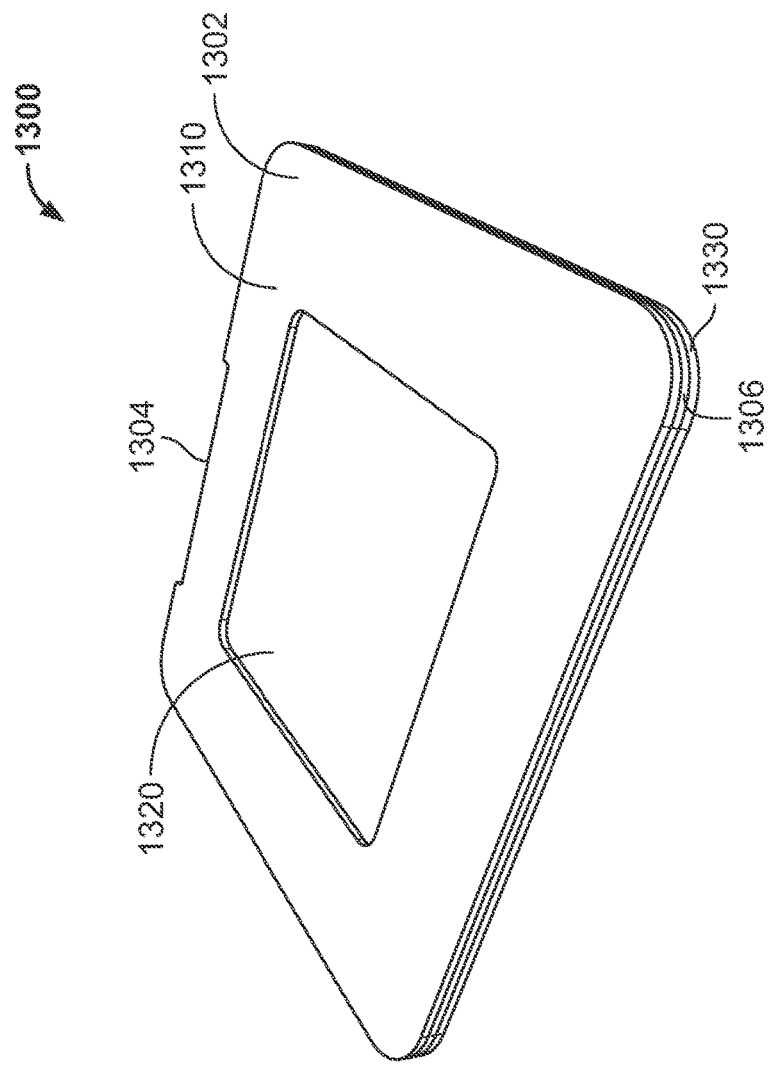

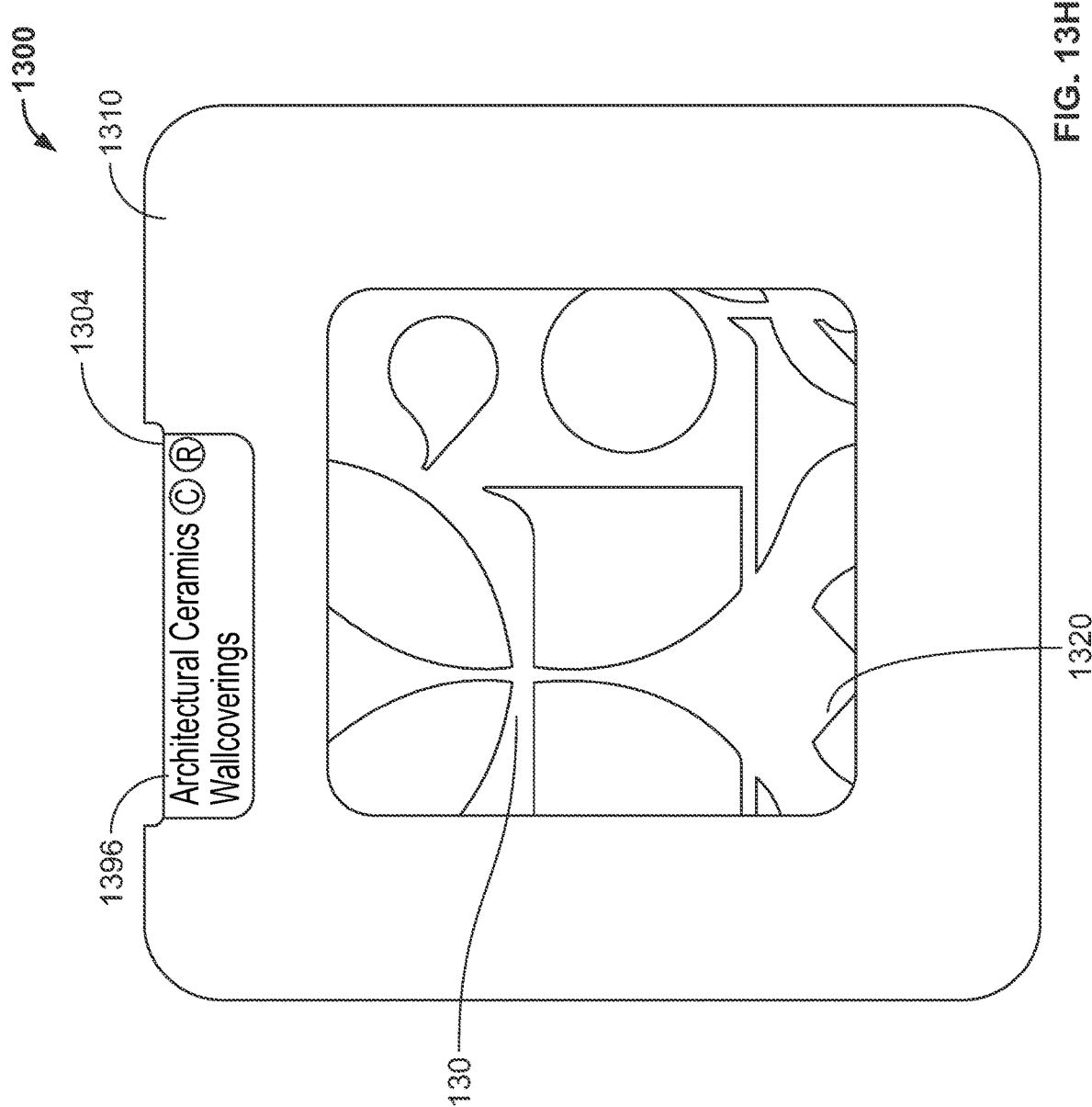

SMART SWATCH APPARATUS AND SYSTEMS

CROSS-REFERENCE TO RELATED APPLICATIONS

This application claims the benefit of U.S. Provisional Patent Application No. 62/837,284, filed Apr. 23, 2019, and entitled "SMART SWATCH APPARATUS AND SYSTEMS," which is hereby incorporated by reference in its entirety.

FIELD OF THE INVENTION

The disclosure relates generally to material holding devices and, more particularly, swatch presentation devices.

BACKGROUND

Designers often consider various materials when creating a new design. For example, a designer may consider various textiles, paint, wood, and leather materials when designing a room. Some manufacturers of materials may provide samples of the materials. For example, a manufacturer may provide small sized samples on a showroom floor. Some manufacturers may provide images of their various materials on a website. Designers may use the samples to analyze if and how a particular material may be used as part of a design.

SUMMARY

In some embodiments, a presentation device may include a swatch display opening in a forward facing surface. The presentation device may also include a swatch securing system adapted for securing a swatch within the swatch display opening. The presentation device may also include a label including identifying information regarding a swatch displayed in the presentation device. The presentation device may also include a transmitter within a transmitter housing, where the transmitter is adapted for wireless transmission of data identifying the swatch secured in the swatch securing system.

In some embodiments, a system includes a presentation device and a computing device. The presentation device may include a swatch display opening in a forward facing surface. The presentation device may also include a swatch securing system adapted for securing a swatch within the swatch display opening. The presentation device may include a label including identifying information regarding a swatch displayed in the presentation device. The presentation device may also include a transmitter within a transmitter housing, where the transmitter is adapted for wireless transmission of data identifying the swatch secured in the swatch securing system. Further, the computing device may be configured to receive the wireless transmission of data from the presentation device, and provide for display at least a portion of the wireless transmission of data.

In some embodiments, a computing device configured to receive a wireless transmission of data from a presentation device. The computing device may also be configured to determine a swatch displayed by the presentation device based on the wireless transmission of data. Further, the computing device may be configured to provide for display information for the swatch.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIGS. 13A, 13B, 13C, 13D, 13E, 13F, 13G, 13H, and 13I illustrates various portions of yet another swatch presentation device in accordance with some embodiments.

DETAILED DESCRIPTION

Figure 1:
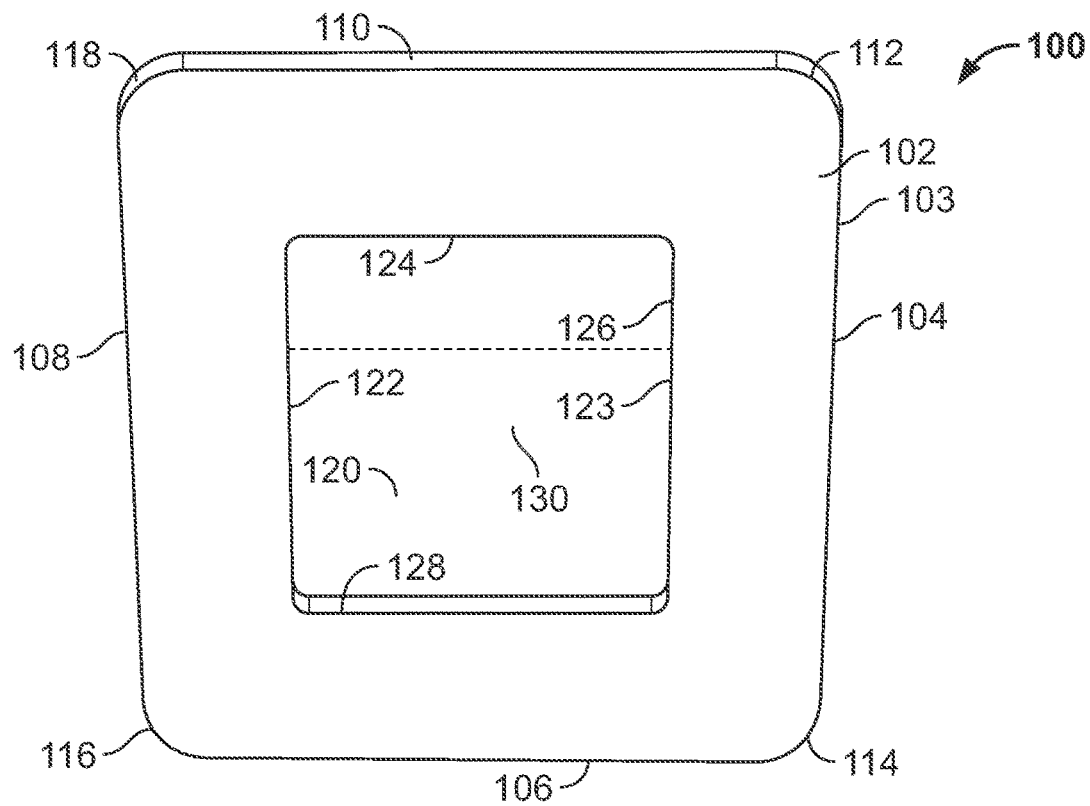
FIG. 1 illustrates a swatch presentation device in accordance with some embodiments.

The description of the preferred embodiments is intended to be read in connection with the accompanying drawings, which are to be considered part of the entire written description of these disclosures. In this description, relative terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship.

Turning to the drawings, FIG. 1 shows an example swatch presentation device 100 with a front surface 102 and an outer portion 103. In some embodiments, the outer portion 103 is defined by a first side 104, a second side 108, a bottom side 106, and a top side 110. In some embodiments, one side transitions to another side via a corner. For example, in FIG. 1, top side 110 transitions to first side 104 by a rounded corner 112. Similarly, first side 104 transitions to bottom side 106 by rounded corner 114; bottom side 106 transitions to second side 108 by rounded corner 116; and second side 108 transitions to top side 110 by rounded corner 118. Swatch presentation device 100 also includes a front cavity 120 defined by inner edge 123. Inner edge 123 may include a top inner edge portion 124, a first side inner edge portion 126, a bottom inner edge portion 128, and a second side inner edge portion 122. In some examples, inner edge portion 123 tracks a contour of outer edge portion 103. Front cavity 120 allows for a piece of material, such as a swatch 130, to be displayed therein. Swatch 130 may be any material, such as a fabric, a non-woven, a film or sheet, or any other material. As described in further detail below, swatch 130 may attach to swatch presentation device 100 with, for example, adhesives (e.g., glue), hook material or loop material (e.g., Velcro®), compression and friction, or any other suitable attachment method.

In some examples, swatch presentation device 100 is manufactured from a foam board, corrugated board, mat board, chip board, or illustration board material. In some embodiments the boards may be coated or laminated to increase the shine of the board. Coatings or lamination can also be used to protect the boards from finger prints, scratches, oil, or other undetectable indications of ware.

Figure 2:
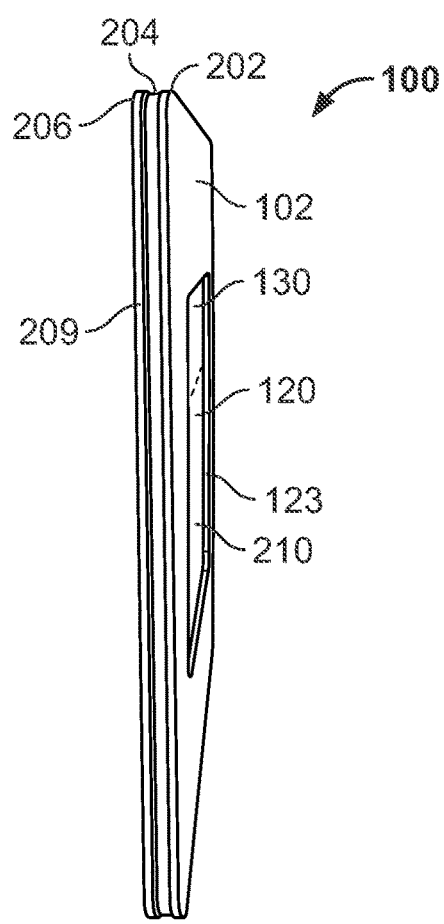
FIG. 2 illustrates another view of the swatch presentation device of FIG. 1 in accordance with some embodiments.

FIG. 2 shows a side view of the swatch presentation device 100 of FIG. 1. As illustrated, swatch presentation device 100 includes a plurality of layers. In this example, swatch presentation device 100 includes a front layer 202 which includes front surface 102 as an outward facing surface. Swatch presentation device 100 also includes spacer layer 204 and back layer 206, both of which will be described in further detail below. Back layer 206 includes a forward facing surface (i.e., facing towards front surface 102 of front layer 202) and a backward facing surface 209. Spacer layer 204 includes a forward facing surface (i.e., facing towards front surface 102 of front layer 202), and a backward facing surface (i.e., facing towards back surface 109 of back layer 206).

In some examples, when swatch presentation device 100 is assembled, the forward facing surface of back layer 206 contacts the backward facing surface of spacer layer 204, while the front facing surface of spacer layer 204 contacts the backward facing surface of front layer 202. As will be understood, in some embodiments the spacer layer 204 can be formed as a single material that also incorporates the back layer 206 or the front layer 202.

In some examples, adhesive, such as glue, is positioned along portions of the forward facing, and backward facing, surfaces of spacer layer 204. To assemble swatch presentation device 100, the forward facing surface of back layer 206 is pressed against the backward facing surface of spacer layer 204. Similar, the backward facing surface of front layer 202 is pressed against the forward facing surface of spacer layer 204. In this manner, spacer layer 204 attaches to both front layer 202 and back layer 206.

In some examples, front layer 202 includes a front opening 210 that forms an opening to front cavity 120. Front cavity 120 is enclosed by inner edge 123 and a front facing surface (not shown) of spacer layer 204. Front cavity 120 may allow for the viewing of swatch 130. For example, swatch 130 may be placed on the front surface of spacer layer 204, where front layer 202 is placed over swatch 130 and onto spacer layer 204 thereby enclosing swatch 130 between front layer 202 and spacer layer 204. In some examples, swatch 130 is attached to spacer layer 204 with adhesive material, such as a glue.

Figure 3:
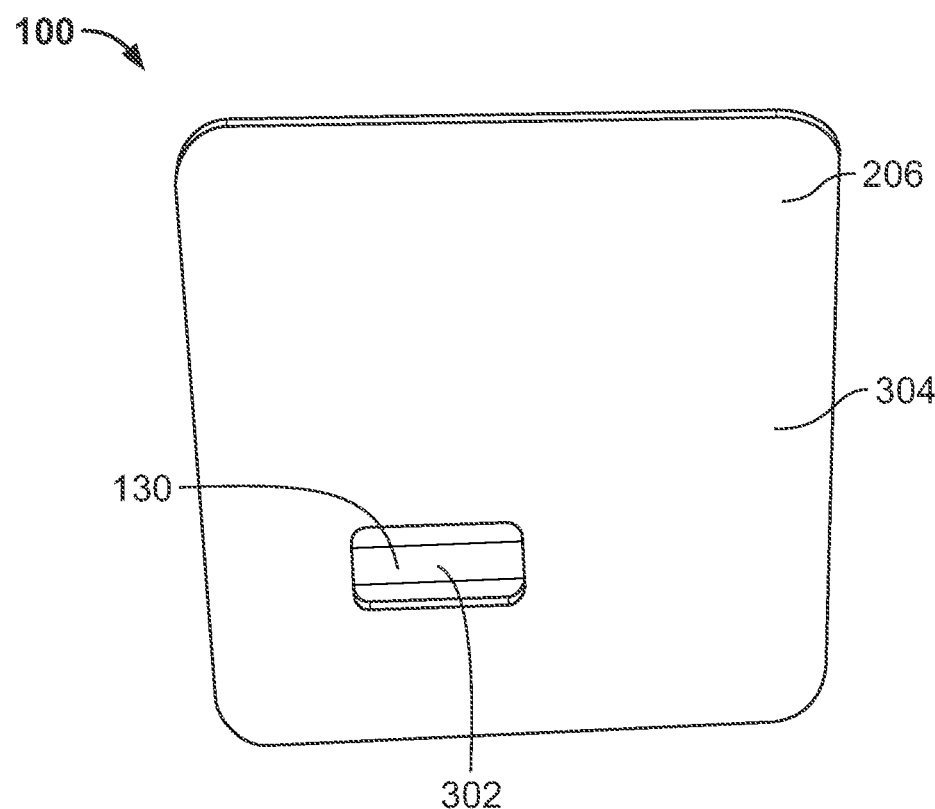
FIG. 3 illustrates another view of the swatch presentation device of FIG. 1 in accordance with some embodiments.

FIG. 3 shows a view of swatch presentation device 100 from an outward facing surface 304 of back layer 206. Back layer 206 further includes a back opening 302. In some examples, spacer layer 204 includes a similar and coinciding opening. In this example, swatch 130 may be seen through back opening 302. In some examples, a transmitting device (e.g., transmitter 1002 shown in FIG. 10), such as a radio frequency identification (RFID) tag, is attached to back layer 206. For example, the transmitting device can be attached to an inwardly facing surface of back layer 206 while allowing the transmitting device to transmit through back opening 302. For example, in the example of an RFID tag, the RFID tag may be stitched to the inwardly facing surface of back layer 206 such that an antennae of the RFID tag transmits through back opening 302. In some examples, all or a portion of the RFID tag protrudes at least partially through back opening 302. In some examples, the RFID tag is positioned elsewhere within swatch presentation device 100 and transmits signals though swatch presentation device 100. In some examples, swatch presentation device 100 includes a plurality of RFID tags. For example, a plurality of RFID tags may be mounted on a forward facing side of back layer 206, either in a side by side configuration or in a stacked configuration (e.g., one on top of the other). Each RFID tag may be effected by magnets in spacer layer 204 and by any other metal material mounted to swatch presentation device 100.

Figure 4:
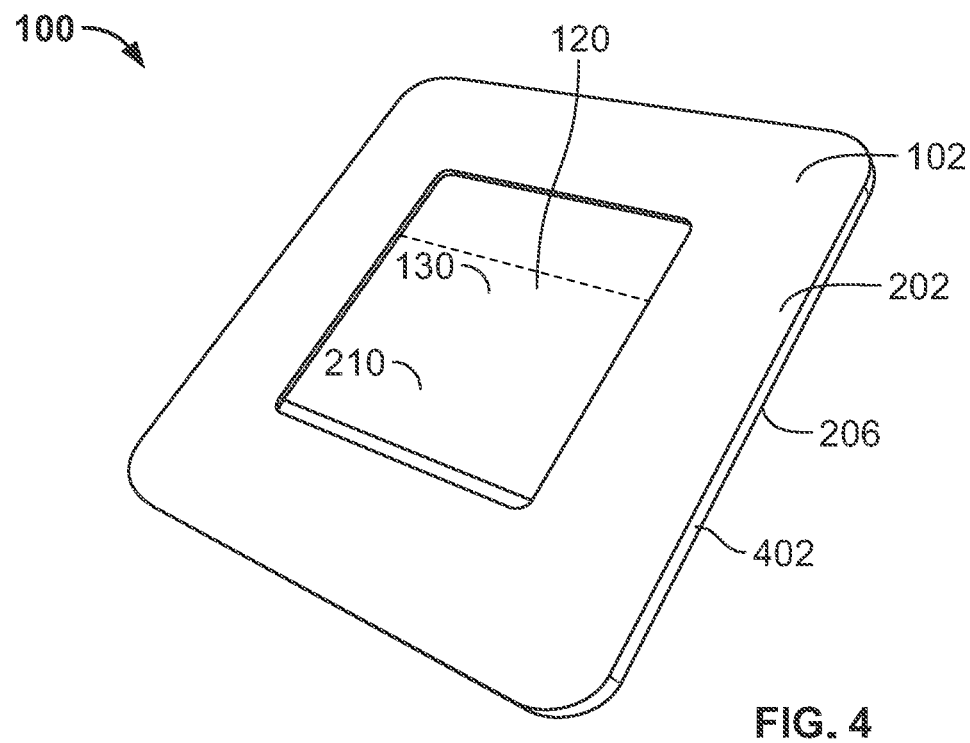
FIG. 4 illustrates yet another view of the swatch presentation device of FIG. 1 in accordance with some embodiments.

FIG. 4 illustrates an elevation view of the swatch presentation device 100 of FIG. 1. As can be seen, swatch 130 can be viewed through front opening 210 to front cavity 120. Spacer layer 204 is connected to front layer 202 and back layer 206. For example, adhesives, loop material or hook material, or any other suitable attachment material may hold spacer layer 204 to front layer 202 and back layer 206. In some examples, there is a seamless, or near seamless, transition from first layer 202 to spacer layer 204, and from spacer layer 204 to back layer 206, along an outer edge 402 of swatch presentation device 100.

Figure 5:
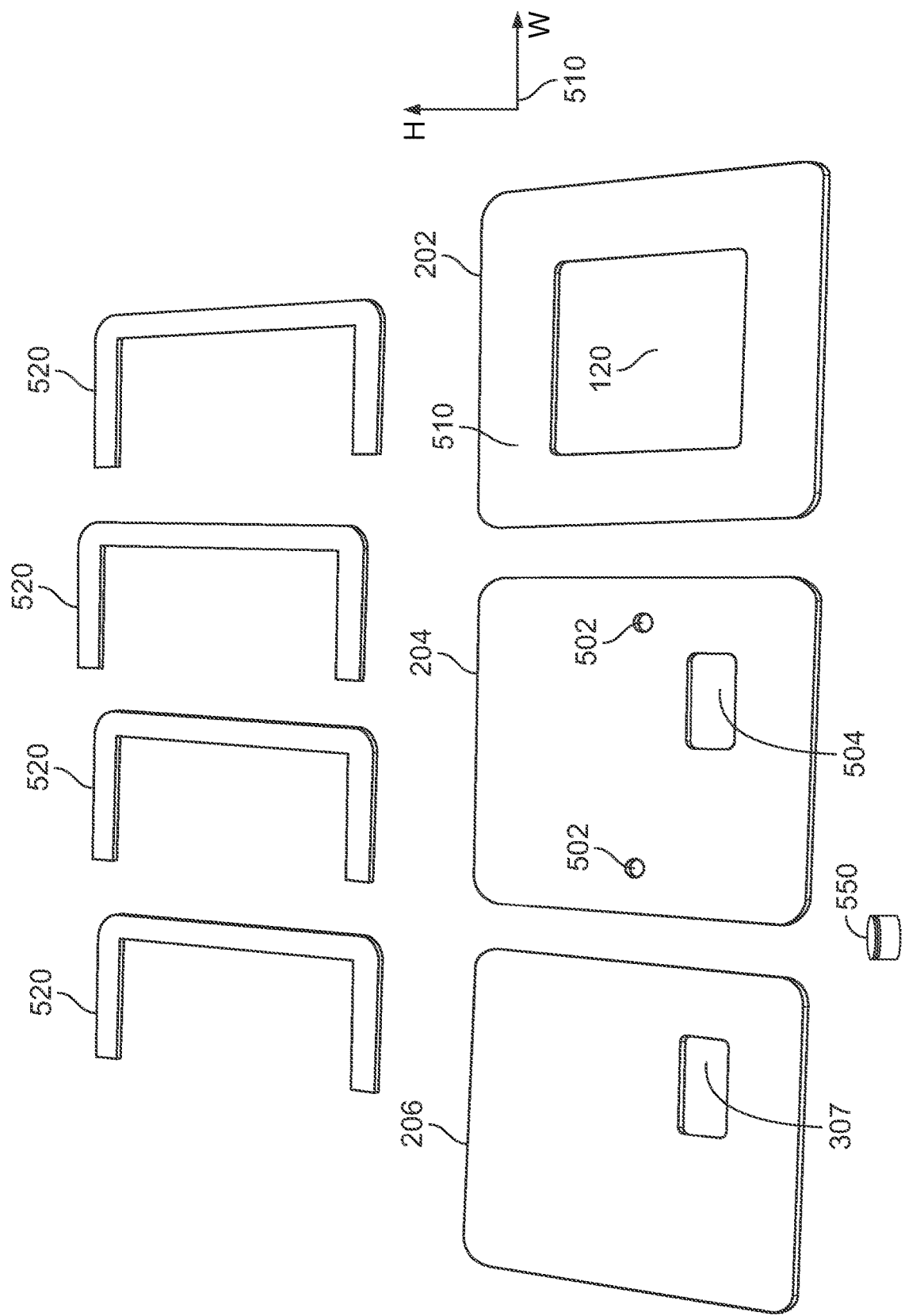
FIG. 5 illustrates various exemplary portions and optional features of the swatch presentation device of FIG. 1 in accordance with some embodiments.

FIG. 5 shows front layer 202, spacer layer 204, and back layer 206 of an embodiment of swatch presentation device 100 prior to assembly. In some examples, front layer 202, spacer layer 204, and back layer 206 have the same, or nearly similar, outer dimensions. For example, a height ("H" in coordinate system 510) of front layer 202 may be the same as, or identical to, a height of spacer layer 204.

Similarly, a height of back layer 206 may be the same as, or identical to, the height of spacer layer 204; and the height of front layer 202 may be the same as, or similar to, the height of back layer 206. Additionally, or alternatively, a width ("W" in coordinate system 510) of front layer 202 may be the same as, or identical to, a width of spacer layer 204. Similarly, a width of back layer 206 may be the same as, or identical to, the width of spacer layer 204; and the width of front layer 202 may be the same as, or similar to, the width of back layer 206.

In some embodiments, such as that shown in FIG. 5, spacer layer 204 includes a space layer opening 504 that, in some examples, coincides with back opening 302 of back layer 206. For example, space layer opening 504 and back opening 302 may create room between a swatch 130 and the outward facing surface 304 of back layer 206 to accommodate a transmitter, such as an RFID tag. In some examples, spacer layer 204 includes one or more apertures (e.g., openings) 502. In this example, spacer layer 204 includes an aperture 502 on either side and opposite each other. The apertures 502 may allow for the placement of magnets 550. Magnets 550 may be any suitable magnets, such as rare earth metal magnets. For example, the magnets may be sized such that aperture 502 provides a friction fit for the magnets. In some embodiments, the magnets are glued to the inner edge of aperture 502. For example, during assembly, adhesive may be placed around an inner edge of aperture 502. The magnet is then placed into aperture 502, where the adhesive allows the magnet to be stuck to the inner edge of aperture 502. In some examples, a forward facing surface of back layer 206 includes adhesive to which may hold the magnet 550 such that magnet 550 at least partially protrudes through aperture 502. have front word facing adhesive and there is a tension fit, no additional adhesive is required to hold magnet 550. For example, magnet 550 may have a thickness that is different than that of spacer layer 204.

In some examples, in addition to spacer layer 204, swatch presentation device 100 may include a frame. The frame may be manufactured out of rubber, plastic, or any other suitable material. The frame may be placed between the forward facing surface of spacer layer 204 (i.e., surface that faces towards front layer 202) and swatch 130. For example, swatch 130 may be positioned (and, in some examples, glued) on the backward facing surface 510 of front layer 202. The frame is then positioned between the forward facing surface of spacer layer 204 and the backward facing surface 510 of front layer 202 such that the forward facing surface of spacer layer 204 contacts a backward facing surface of the frame, and a forward facing surface of the frame contacts the swatch 130 to secure the swatch 130 against the backward facing surface of front layer 202. In some examples, a method of assembly includes placing an RFID tag on back layer 206, followed by placing one or more swatches 130 on back layer 206, which is followed by placing spacer layer 204 on top of the swatches 130.

FIG. 5 illustrates half-frames 520. Swatch presentation device 100 may employ two half-frames 520. For example, one half-frame may be placed on either side of a swatch 130 that is placed on the backward facing surface of front layer 202. Each half-frame 520 may be glued, for example, to the swatch 120 or, in some examples, to the backward facing surface of front layer 202.

Figure 6C:
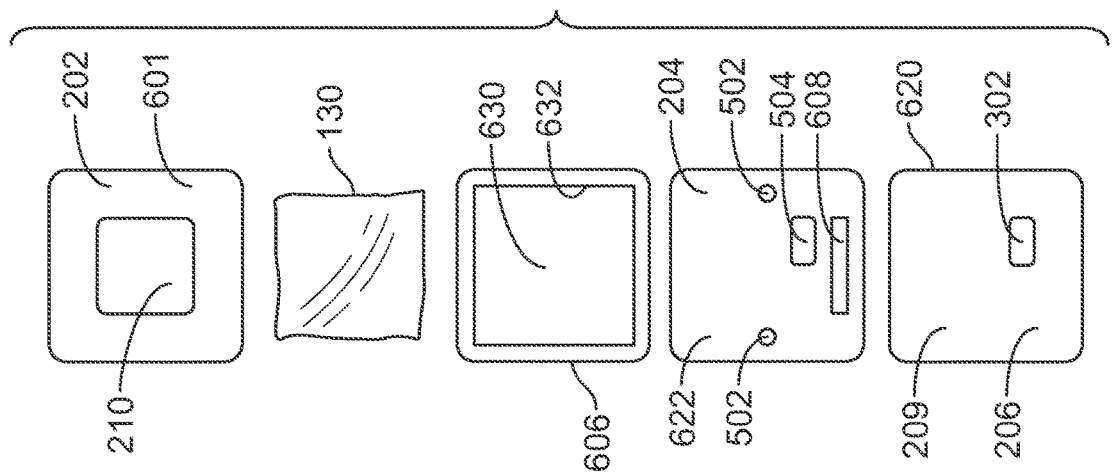
FIG. 6C illustrates components of yet another swatch presentation device in accordance with some embodiments.
Figure 6B:
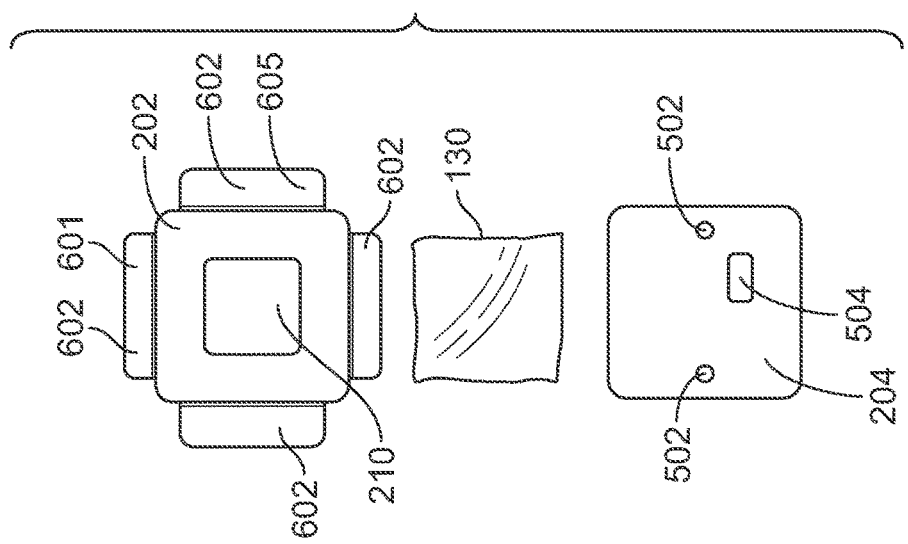
FIG. 6B illustrates components of another swatch presentation device in accordance with some embodiments.
Figure 6A:
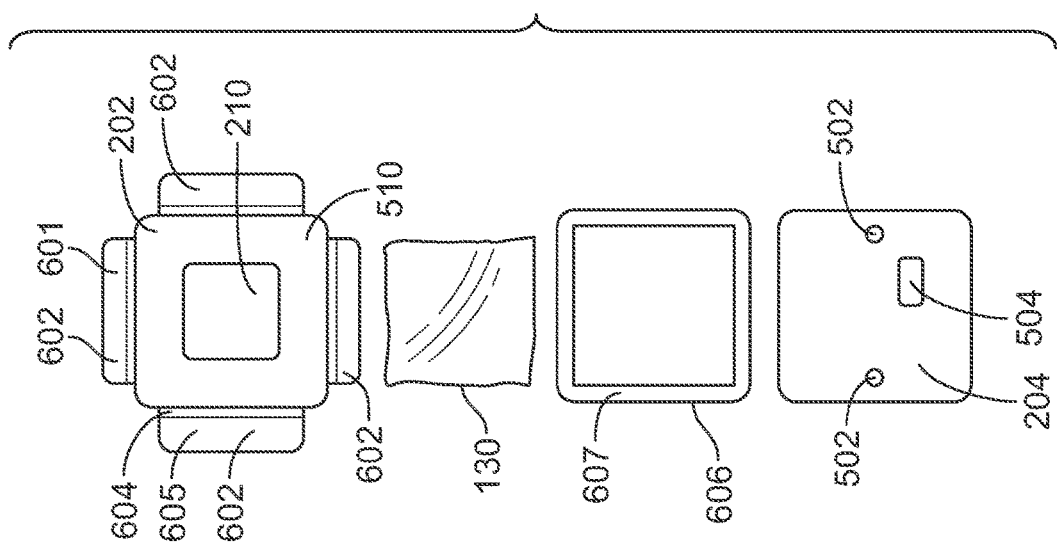
FIG. 6A illustrates components of a swatch presentation device in accordance with some embodiments.

FIGS. 6A, 6B, and 6C show various configurations of components of swatch presentation device 100 described herein. For example, FIG. 6A shows a swatch presentation device 100 that includes a front layer 202, swatch 130, frame 606, and spacer layer 204. Frame 606 includes an opening 630, which may be a centralized opening defined by an inner edge 632. In some examples, when assembled, portions of frame 606 extend along an outer perimeter of backward facing surface 601 of front layer 202. In some examples, frame 606 in includes one or more apertures, such as apertures 502. In some examples, swatch 130 is placed between frame 606 and the backward facing surface 601 of front layer 202, and frame 606 is glued to the backward facing surface 601 of front layer 202, thereby securing swatch 130 to the swatch presentation device 100.

In this example, there is no back layer 206. Instead, spacer layer 204 acts as the back layer to swatch presentation device 100. To assemble swatch presentation device 100 in this configuration, swatch 130 is placed on the backward facing surface 510 of front layer 202. The swatch 130 may be placed such that its center coincides, or nearly coincides, with the center of 210 of front layer 202. Frame 606 may then be positioned such as to contact swatch 130 along an outer perimeter. For example, frame 606 may be positioned such that it contacts swatch 130 on all sides. In some examples, frame 606 contacts backward facing surface 510 without contacting swatch 130. In some examples, the frame 606 may be positioned so that its center coincides, or nearly coincides, with the center of 201 of front layer 202. Spacer layer 204 may then be positioned such that its forward facing surface contacts a backward facing surface 607 of frame 606. In some examples, a transmitter, such as an RFID tag, may be positioned within space layer opening 504. In some examples, space layer opening 504 allow the viewing of a backside of swatch 130. For example, the backside of swatch 130 may include Description information that may be viewed through space layer opening 504.

In FIG. 6A, front layer 202 includes a clamping system 601 to hold it together with swatch 130, frame 606, and spacer layer 204, front layer 202. In this example, clamping system 601 includes clamps 602 out from each side of front layer 202. Each clamp 602 may be attached to the front surface 102 of front layer 202. In some examples, one or more clamps 602 are attached to an outside edge of front layer 202. Each clamp 602 may include a side portion 604 and a clamp portion 605. Merely for convenience, the length of side portion 604 indicates a length along the longer sides of side portion 604, and the width of side portion 604 refers to a length along the shorter sides of side portion 604 (e.g., between the "score lines").

In some embodiments, a width of each side portion 604 may be at least the total thickness of front layer 202, swatch 130, frame 606, and spacer layer 204. In some embodiments, the width of each side portion 604 may be slightly less than the total thickness of front layer 202, swatch 130, frame 606, and spacer layer 204 (or whatever layers are present in the swatch presentation device 100. As such, side portion 604 may be wide enough to accommodate the various portions of swatch presentation device 100 to allow clamp portion 605 to fold over the last layer, in this example, spacer layer 204. Once folded, clamp portion 605 may contact a backward facing surface of spacer layer 204. In some examples, adhesive, such as glue, is used to secure clamp portion 605 to spacer layer 204. In some examples, a hook material or loop material, or any other suitable attachment mechanism may be used.

FIG. 6B shows another configuration for swatch presentation device 100. This example is similar to the example of FIG. 6A except that swatch presentation device 100 does not include a frame 606. For example, the front facing surface of spacer layer 204 (again, acting as the back layer), may, in this example, contact portions of swatch 130 thereby holding swatch 130 against the backward facing surface of front layer 202. The swatch 130 may be placed such that its center coincides, or nearly coincides, with the center of 210 of front layer 202. The front facing surface of spacer layer 204 may then be positioned such as to contact swatch 130 along an outer perimeter. For example, the front facing surface of spacer layer 204 may be positioned such that it contacts swatch 130 on all sides. In some examples, the front facing surface of spacer layer 204 may be positioned so that its center coincides, or nearly coincides, with the center of 201 of front layer 202. Clamping system 601 may then be employed to hold swatch 130 and spacer layer 204 to front layer 202. For example, one or more clamps 602 of clamping system 601 may be folded over such that a clamp portion 605 of each clamp 602 contacts a backward facing surface of spacer layer 204. In the example of FIG. 6B, a width of the side portions 604 (e.g., as defined by the distance between the "score lines") is thinner than the side portions 604 of FIG. 6A. In some examples, adhesive, such as glue, is used to secure clamp portion 605 to spacer layer 204. In some examples, a hook material or loop material, or any other suitable attachment mechanism may be used.

FIG. 6C shows yet another configuration for a swatch presentation device 100. In this example, swatch presentation device 100 includes front layer 202, swatch 130, frame 606, spacer layer 204, and back layer 206. In this example, front layer 202 does not include clamping system 601. However, in some embodiments, claiming system 6012 may be employed with this configuration. To assemble swatch presentation device 100 in this configuration, swatch 130 is placed on the backward facing surface 601 of front layer 202. The swatch 130 may be placed such that its center coincides, or nearly coincides, with the center of 210 of front layer 202. In some examples, adhesive secures swatch 130 to the backward facing surface 601 of front layer 202.

Frame 606 may then be positioned such as to contact swatch 130 along an outer perimeter. For example, frame 606 may be positioned such that it contacts swatch 130 on all sides. In some examples, the frame 606 may be positioned so that its center coincides, or nearly coincides, with the center of 201 of front layer 202. In some examples, adhesive secures frame 606 to the backward facing surface of front layer 202 and/or to swatch 130. Spacer layer 204 may then be positioned such that its forward facing surface contacts a backward facing surface 607 of frame 606. In some examples, adhesive secures spacer layer 204 to frame 606. In some examples, a transmitting device (e.g., transmitter 1002 shown in FIG. 10), such as an RFID tag, may be positioned within space layer opening 504.

In this example, spacer layer 204 further includes a second middle opening 608. The second middle opening 608 may allow room for, for example, an RFID tag. In some examples, a reinforcement member (not shown) is positioned within second middle opening 608. The reinforcement member may be a metal plate, a magnet, a strip of plastic, or any other suitable material. In some examples, the reinforcement member serves as an attraction device so that swatch presentation device 100 attaches (e.g., "sticks") to a presentation platform, such as the presentation platform of FIG. 7 discussed below. For example, the reinforcement member may be a magnet that attracts to the presentation board. Alternatively, the reinforcement member may be a metal plate that attracts to a magnet of the presentation board. In some examples, second middle opening 608 provides a friction fit for the reinforcement member. In some examples, the forward facing surface of back layer 206 includes a pouch (not shown) that is stitched to the forward facing surface of back layer 206, where the pouch may be stored within second middle opening 608. In this example, the reinforcement member may be placed within the pouch, where the pouch extends partially, or entirely, into the second middle opening.

Back layer 206 may be positioned over the backward facing surface of spacer layer 204. In some examples, adhesive secures the forward facing surface 620 of back layer 206 to the backward facing surface 622 of spacer layer 204. Additionally, or alternatively, in some examples hook and loop material, or any other suitable material, may be used to secure back layer 206 to spacer layer 204.

Figure 7:
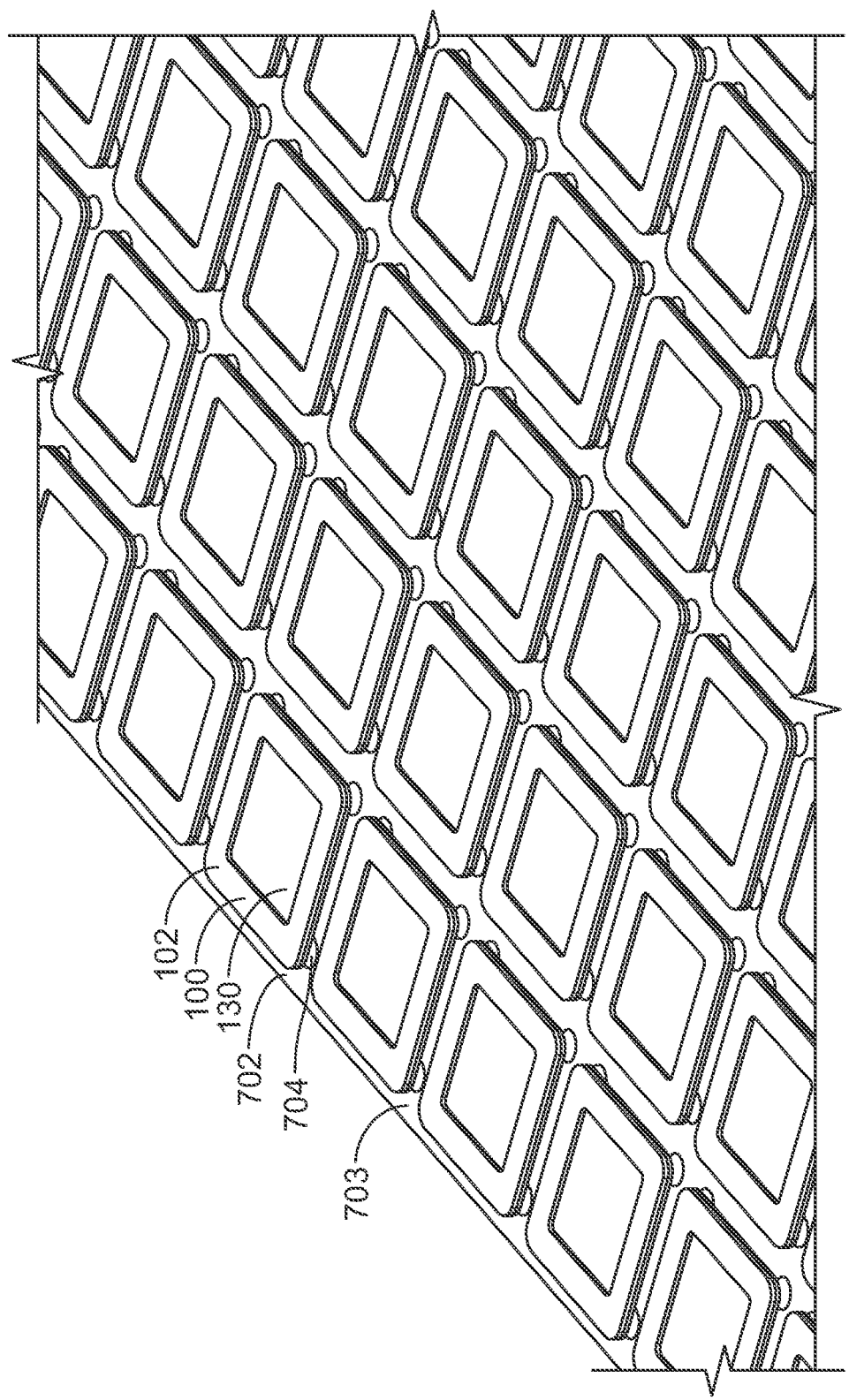
FIG. 7 illustrates a perspective view plurality of the swatch presentation devices of FIG. 1 attached to a presentation platform in accordance with some embodiments.
Figure 8:
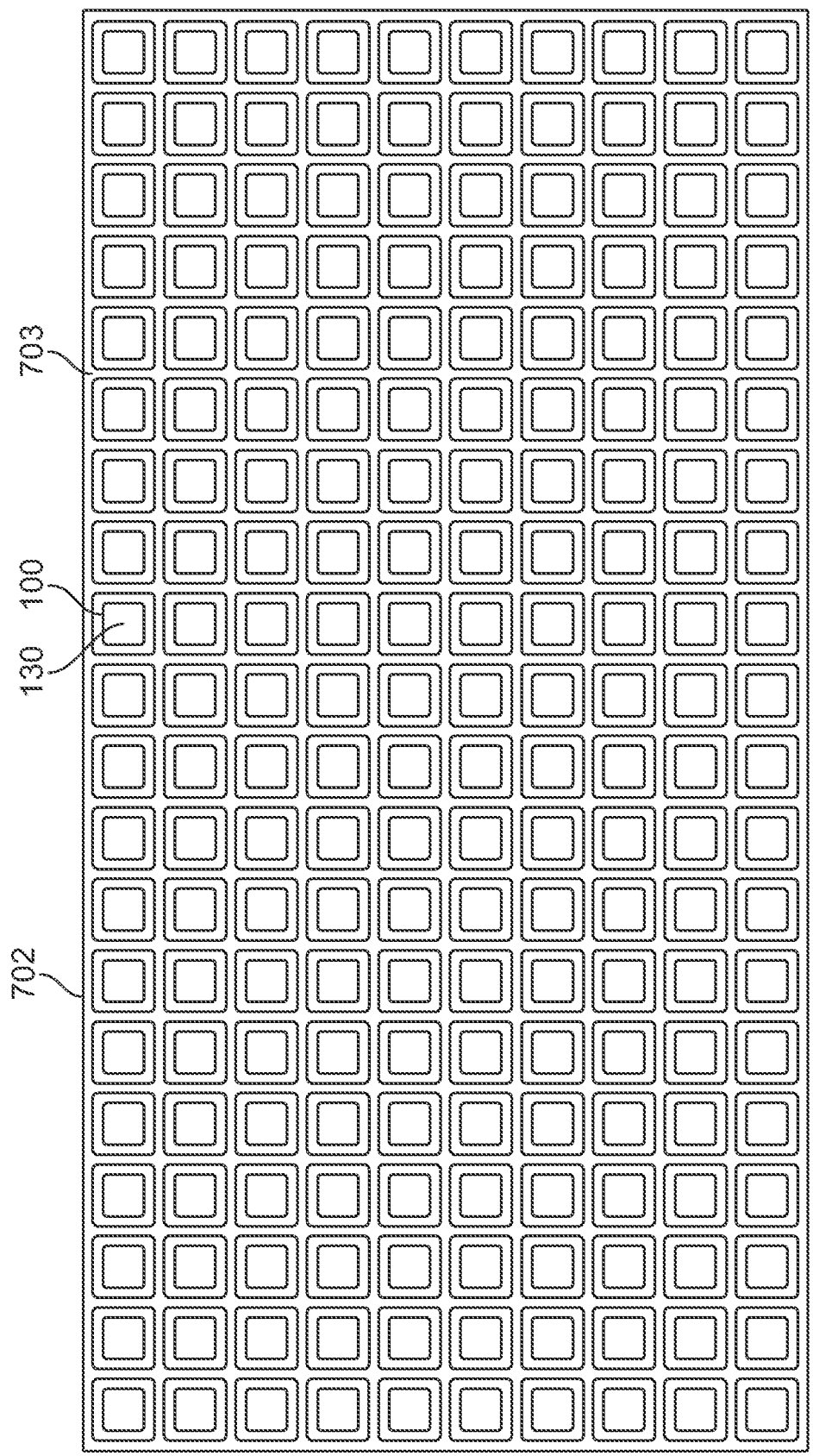
FIG. 8 illustrates a front view of the plurality of swatch presentation devices of FIG. 1 attached to the presentation platform of FIG. 7 in accordance with some embodiments.

FIG. 7 shows illustrates a presentation platform 702 that supports a plurality of swatch presentation devices 100. In this example, the presentation platform 702 includes a plurality of standoffs 704 that may be used to support a swatch presentation device. Each standoff 704 may be attached to presentation platform 702. For example, the standoffs 704 may be adhered (e.g., glued) to presentation platform 702. The standoffs 704 may allow a person to place their fingers between the presentation platform 702 and swatch presentation device 100 to remove swatch presentation device 100 from the presentation platform 702. In some examples, the standoffs 704 form a suction with the surface 703 of presentation platform 702. The standoffs 702 may be manufactured from a rubber or rubberlike material. In some examples, the standoffs 702 may be plastic, or any other suitable material. As illustrated, each swatch presentation device 100 is positioned over four standoffs 704. In this example, each swatch presentation device 100 is placed on four standoffs 704 such that each corner of a back surface of swatch presentation device 100 is positioned on a standoff 704. As such, each swatch 130 for each of the plurality of swatch presentation devices 100 is visible. FIG. 8 shows an overhead view of the same presentation platform 702 holding the plurality of swatch presentation devices 100.

Figure 9:
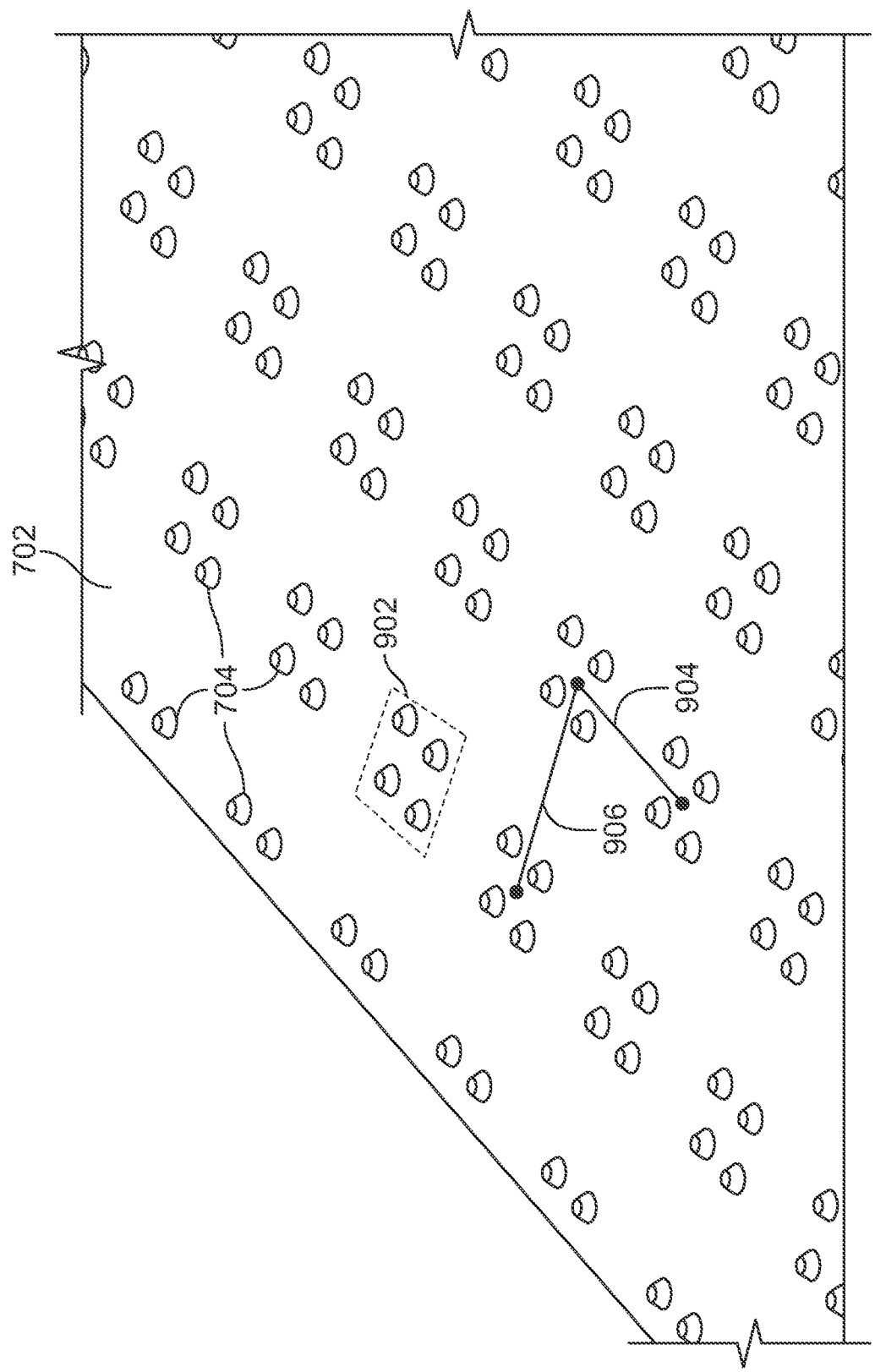
FIG. 9 illustrates a perspective view of the presentation platform of FIG. 7 with the swatch presentation devices removed in accordance with some embodiments.

FIG. 9 illustrates the presentation platform 702 without the plurality of swatch presentation devices 100. As illustrated, four standoffs 704 are grouped together to form a swatch support system 902. Each swatch support system 902 may be spaced apart from the nearest swatch support system 902 in a first direction by a first minimum distance 904. Similarly, each swatch support system 902 may be spaced apart from the nearest swatch support system 902 in a second direction, which may be perpendicular to the first direction, by a second minimum distance 906. Each of first minimum distance 904 and second minimum distance 906 may be measured from a center point of each swatch support system 902. In some examples, first minimum distance 904 and second minimum distance 906 are the same. In some examples, first minimum distance 904 is greater than second minimum distance 906. In yet other examples, first minimum distance 904 is less than second minimum distance 906. In some examples, two standoffs 704 form a swatch support system 902. In other words, only two standoffs 704 are needed to support each swatch presentation device 100.

Figure 10:
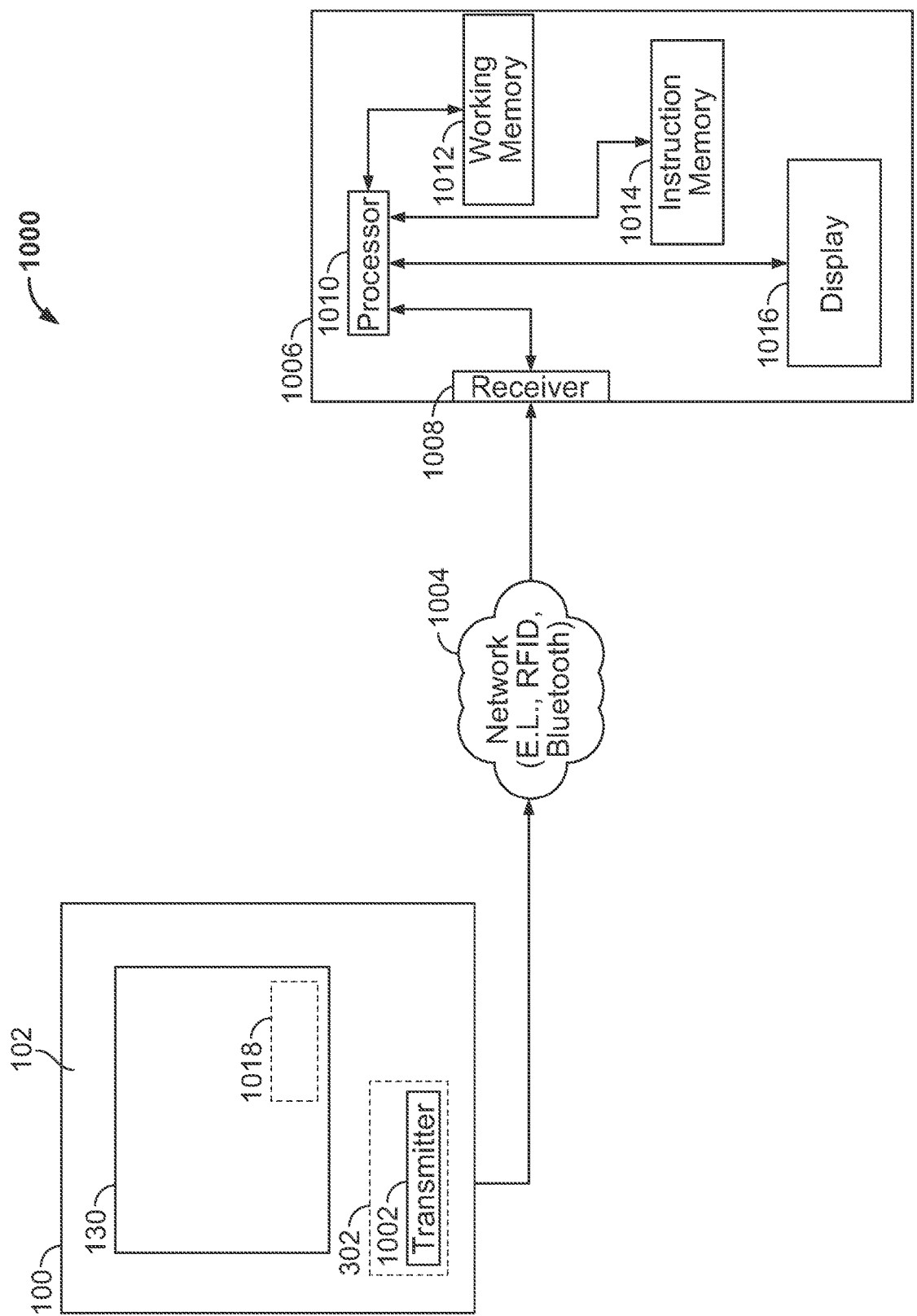
FIG. 10 illustrates a swatch presentation system that includes the swatch presentation device of FIG. 1 in accordance with some embodiments.

FIG. 10 shows a swatch presentation system 1000 that includes swatch presentation device 100 and computing device 1006. In this example, swatch presentation device 100 includes a transmitter 1002. Transmitter 1002 may be, for example, an RFID tag, a Bluetooth® transmitter, a transceiver, or any other suitable transmitting device. Transmitter 1002 may transmit data, such as data related to swatch presentation device 100 or to swatch 130, over network 1004. Network 1004 may be an RFID or Bluetooth® network, for example. In some examples, transmitter 1002 is configured to store and transmit data relating to swatch presentation device 100 or swatch 302. For example, transmitter 1002 may store and transmit a swatch identification (ID) that identifies swatch presentation device 100. In some examples, transmitter 1002 may store and transmit swatch description information such as manufacture information, material information, color information, cleaning information, or any other information.

Optionally, in some examples swatch 130 may include description information 1018. Description information 1018 may include, for example, manufacture information, material information, color information, material maintenance information, material cleaning information, or any other information.

Computing device 1006 is also operatively coupled to network 1004. Computing device 1006 can be a computer, a workstation, a laptop, a server such as a cloud-based server, a smartphone, or any other suitable device. Computing device 1006 may include one or more processors, one or more field-programmable gate arrays (FPGAs), one or more application-specific integrated circuits (ASICs), one or more state machines, digital circuitry, or any other suitable circuitry. In this example, computing device 1006 includes receiver 1008, processor 1010, working memory 1012, instruction memory 1014, and display 1016.

Receiver 1008 may be any suitable receiver, such as an RFID receiver, Bluetooth receiver, or a transceiver. Receiver 1008 is operable to receive data from network 1004. For example, receiver 1008 is operable to receive data transmitted by transmitter 1002 over network 1004.

Processor 1010 include one or more central processing units (CPUs), one or more graphics processing units (GPUs), one or more digital signal processors (DSPs), one or more micro-controllers, or any other suitable processing device. Processor 1010 can be configured to perform a certain function or operation by executing code, stored on instruction memory 1014, embodying the function or operation.

Instruction memory 1014 can store instructions that can be accessed (e.g., read) and executed by processor 1010. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Instruction memory 1014 may store instructions that, when executed by processor 1010, may cause processor 1010 to perform one or more functions, such as obtaining received data from receiver 1008.

Processor 1010 can store data to, and read data from, working memory 1012. For example, processor 1010 can store a working set of instructions to working memory 1012, such as instructions loaded from instruction memory 1014. Processor 1010 can also use working memory 1012 to store dynamic data created during the operation of computing device 1006. Working memory 1012 can be a random access memory (RAM) such as a static random access memory (SRAM) or dynamic random access memory (DRAM), or any other suitable memory.

Display 1016 may display data obtained by processor 1010. For example, processor 1010 may obtain received data from receiver 1008, and may format the data for display. Processor 1010 may then provide the formatted data to display 1016 for display. In some examples, display 206 can be a touchscreen, where user interface 205 is displayed on the touchscreen.

Although just one swatch presentation device 100 is illustrated, computing device 1006 is operable to receive data from a plurality of swatch presentation devices 100 that include transmitters 1002. For example, computing device 1006 may receive, over network 1004, data identifying a plurality of swatch presentation devices 100, such as a swatch ID. Computing device 1006 may determine information related to the identified swatch presentation device 100 based on the received swatch ID. For example, computing device 1006 may determine description information for the swatch 130 corresponding to the identified swatch presentation device 100. Computing device 1006 may cause the display of the determined information, such as description information, to display 1016.

In some examples, computing device 1006 accesses a database (not shown) to determine description information for the identified swatch presentation device 100. The database may be a local database or a remote database, such as one located on a remote storage device, a cloud-based server, a memory device, a networked computer, or on any networked storage device. In some examples, the database includes a mapping of swatch presentation devices 100 to swatches 130, along with description information for each swatch 130. Based on an obtained swatch ID received from a swatch presentation device 100, computing device 1006 accesses the database to determine the corresponding swatch 130 being presented by the identified swatch presentation device 100. Computing device 1006 may also access the database to determine the description information corresponding to the determined swatch 130.

In some examples, computing device 1006 may be the electronic palette apparatus as described in U.S. Provisional Application No. 62/828,192, filed Apr. 2, 2019.

Figure 11A:
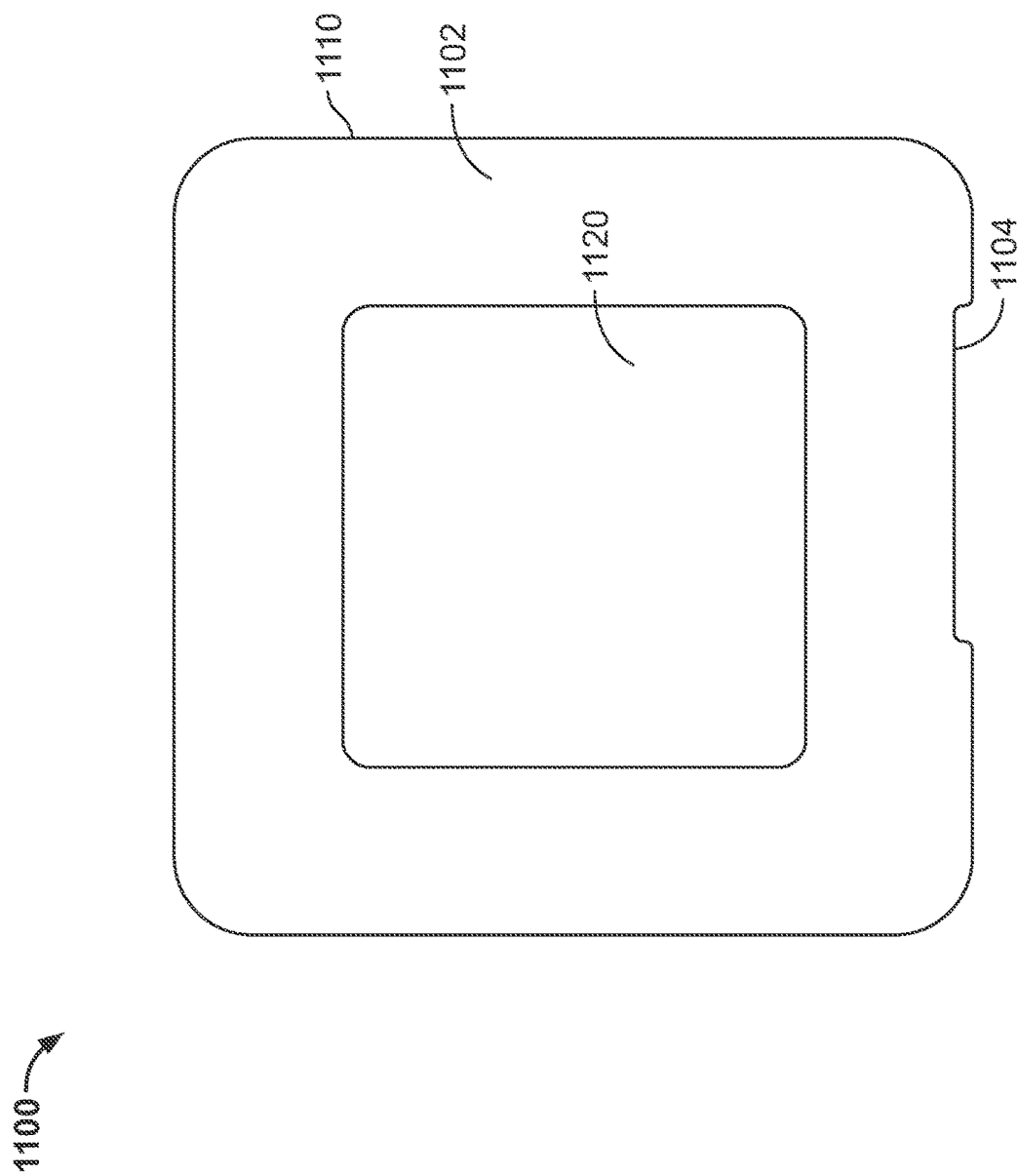
FIGS. 11A, 11B, and 11C illustrate various portions of another swatch presentation device in accordance with some embodiments.
Figure 11C:
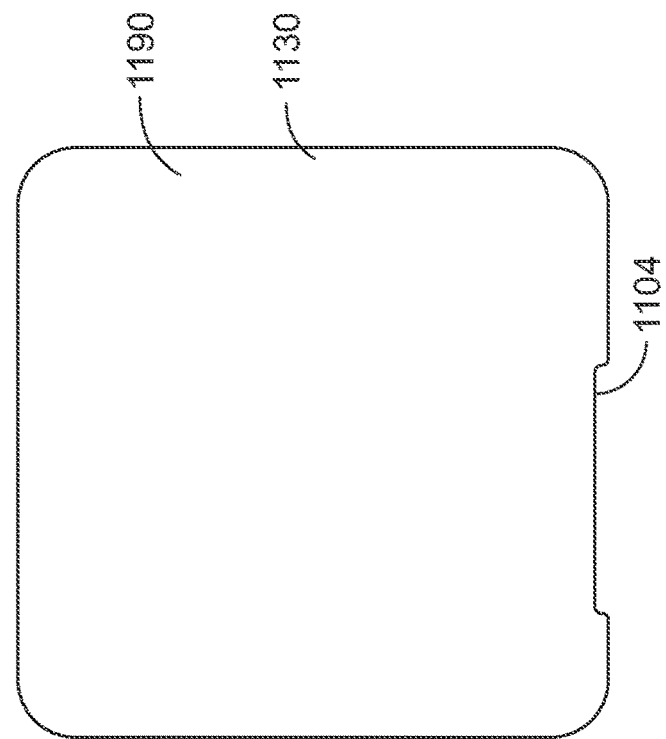
Figure 11B:
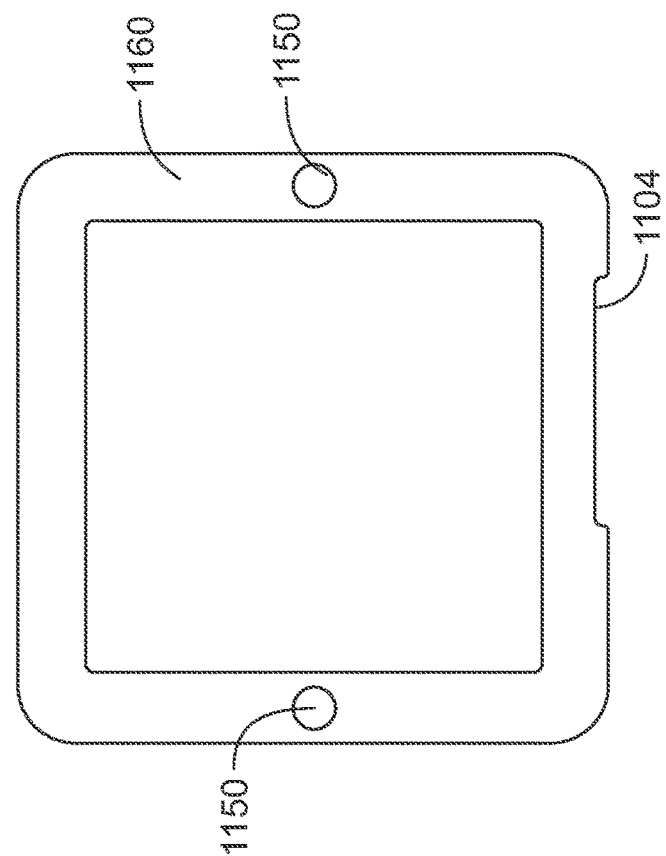

FIGS. 11A-11C illustrate various portions of an example swatch presentation device 1100. While these illustrations include dimensions for some portions of the swatch presentation device 1100, these dimensions are merely exemplary and are not intended to limit the size and/or shape of swatch presentation device 1100. In addition, in some examples, the exemplary swatch presentation device 1100 is made of a black mat board material, and has an overall thickness of approximately 0.0625 inches. The material and thickness are also only exemplary and are not intended to limit the material, size, and/or shape of swatch presentation device 1100.

FIG. 11A illustrates a front layer 1110 that includes a front surface 1102 that encloses a front cavity 1120 of swatch presentation device 1100. The back side of front surface 1102 may include adhesive. Front layer 1110 may also include a recessed portion 1104 along one side. FIG. 11B illustrates a frame 1106 which may attach to the back side of front surface 1102 with the adhesive. Frame 1160 also includes two apertures 1150 opposite each other on two sides of frame 1160. Frame 1160 may also include adhesive on its back side. Frame 1160 may also include a recesses portion 1104 that coincides with the recessed portion 1104 of front layer 1110. FIG. 11C illustrates a backward facing surface 1190 of a back layer 1130 of the swatch presentation device 1100. A forward facing layer of the back layer 1130 may attach to frame 1160 with the adhesive on the back side of frame 1160. Back layer 1130 may also include a recessed portion 1104 that coincides with the recessed portions 1104 of front layer 1110 and frame 1160. In some examples, a sticker is placed over the recessed portions 1104, which may aid in holding the portions together.

Figure 12A:
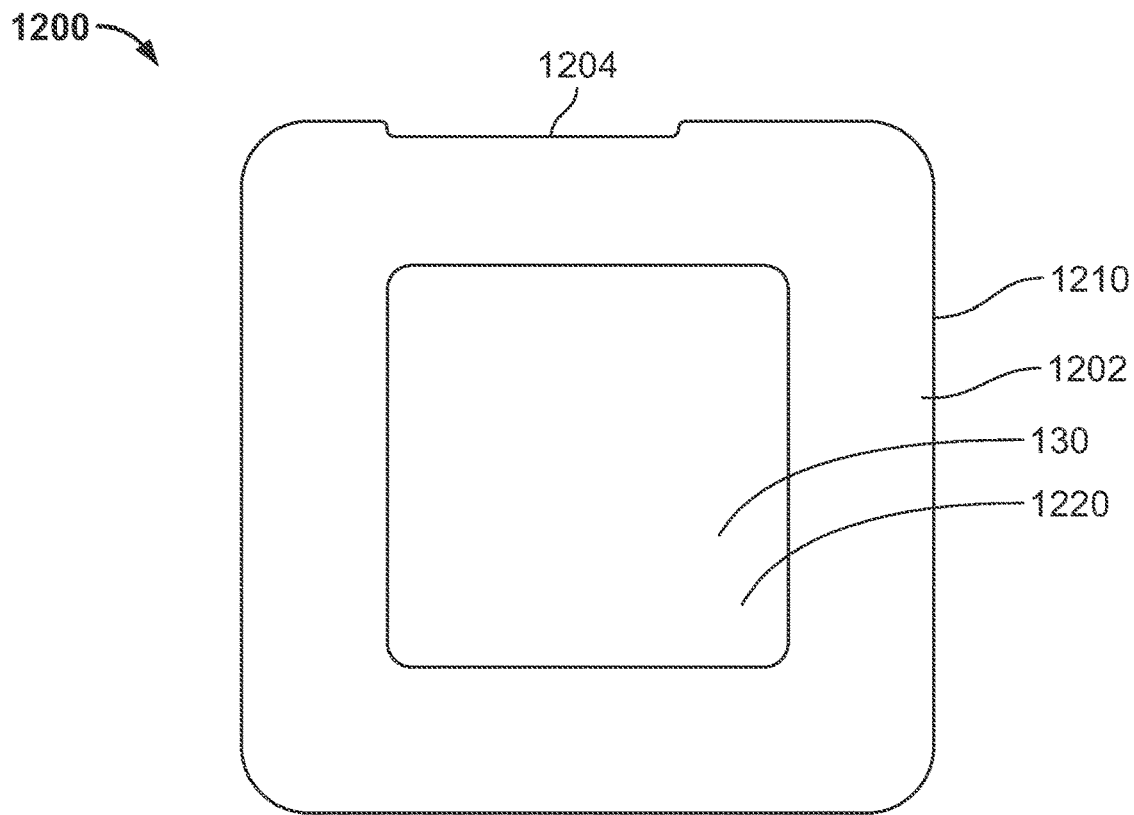
FIG. 12A illustrates various portions of yet another swatch presentation device in accordance with some embodiments.
Figure 12B:
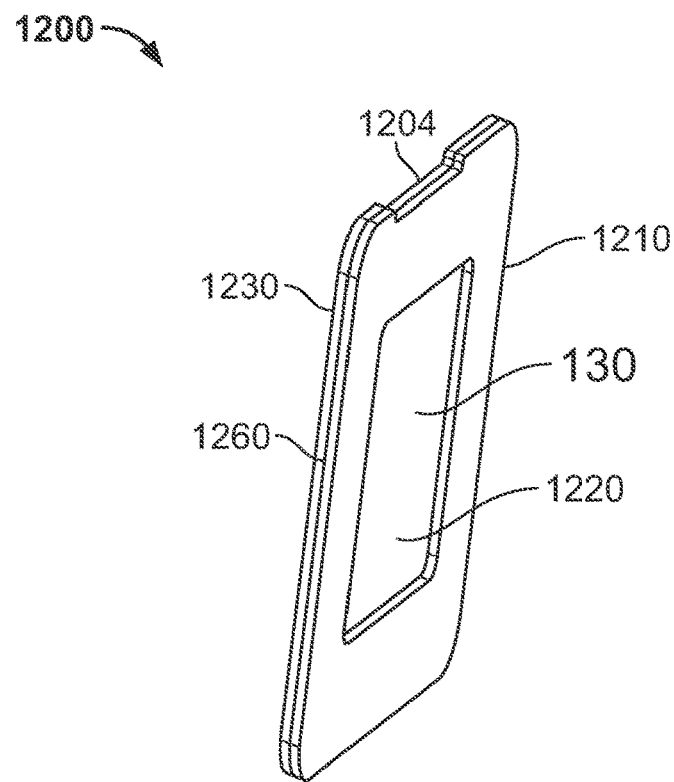
FIG. 12B illustrates various portions of the swatch presentation device of FIG. 12A in accordance with some embodiments.
Figure 12C:
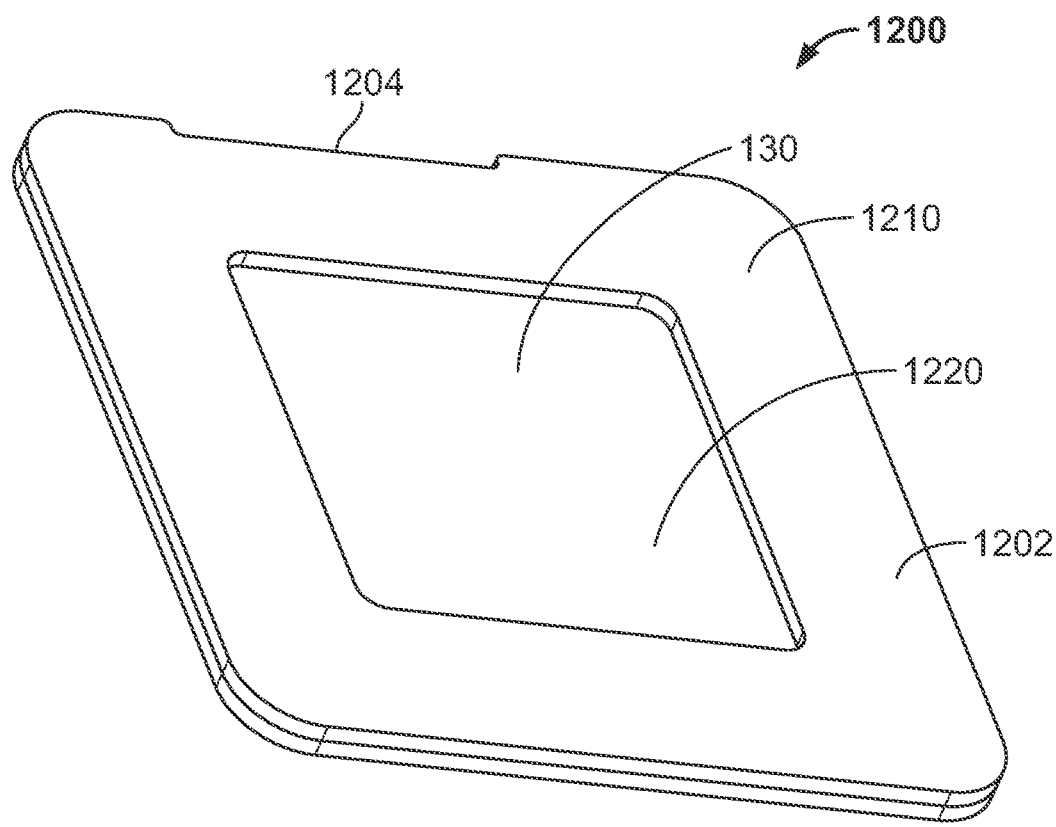
FIG. 12C illustrates various portions of the swatch presentation device of FIG. 12A in accordance with some embodiments.
Figure 12D:
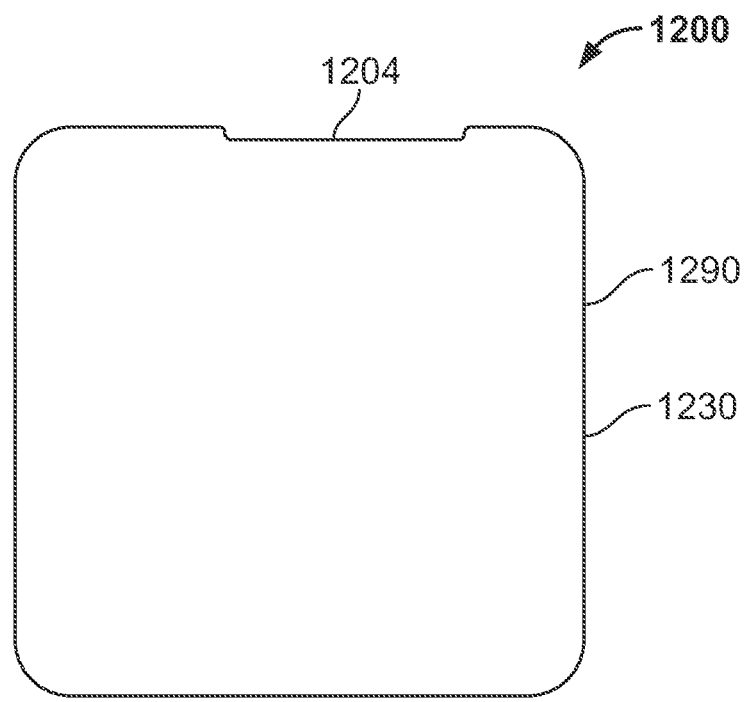
FIG. 12D illustrates various portions of the swatch presentation device of FIG. 12A in accordance with some embodiments.

FIG. 12A illustrates a front layer 1210 that includes a front surface 1202 that encloses a front cavity 1220 of swatch presentation device 1200. A swatch 130 is viewed through front cavity 1220. The back side of front surface 1202 may include adhesive to attach the swatch 130. Front layer 1210 may also include a recessed portion 1204 along one side. FIG. 12B illustrates a side view of the swatch presentation device 1200 that includes front layer 1210, a frame 1260, and a back layer 1230. Each of the front layer 1210, frame 1260, and back layer 1230 may include coinciding recessed portions 1204. FIG. 12C illustrates another view of the swatch presentation device 1200. FIG. 12D illustrates a view of the swatch presentation device 1200 from a backward facing surface 1290 of back layer 1230.

Figure 13A:
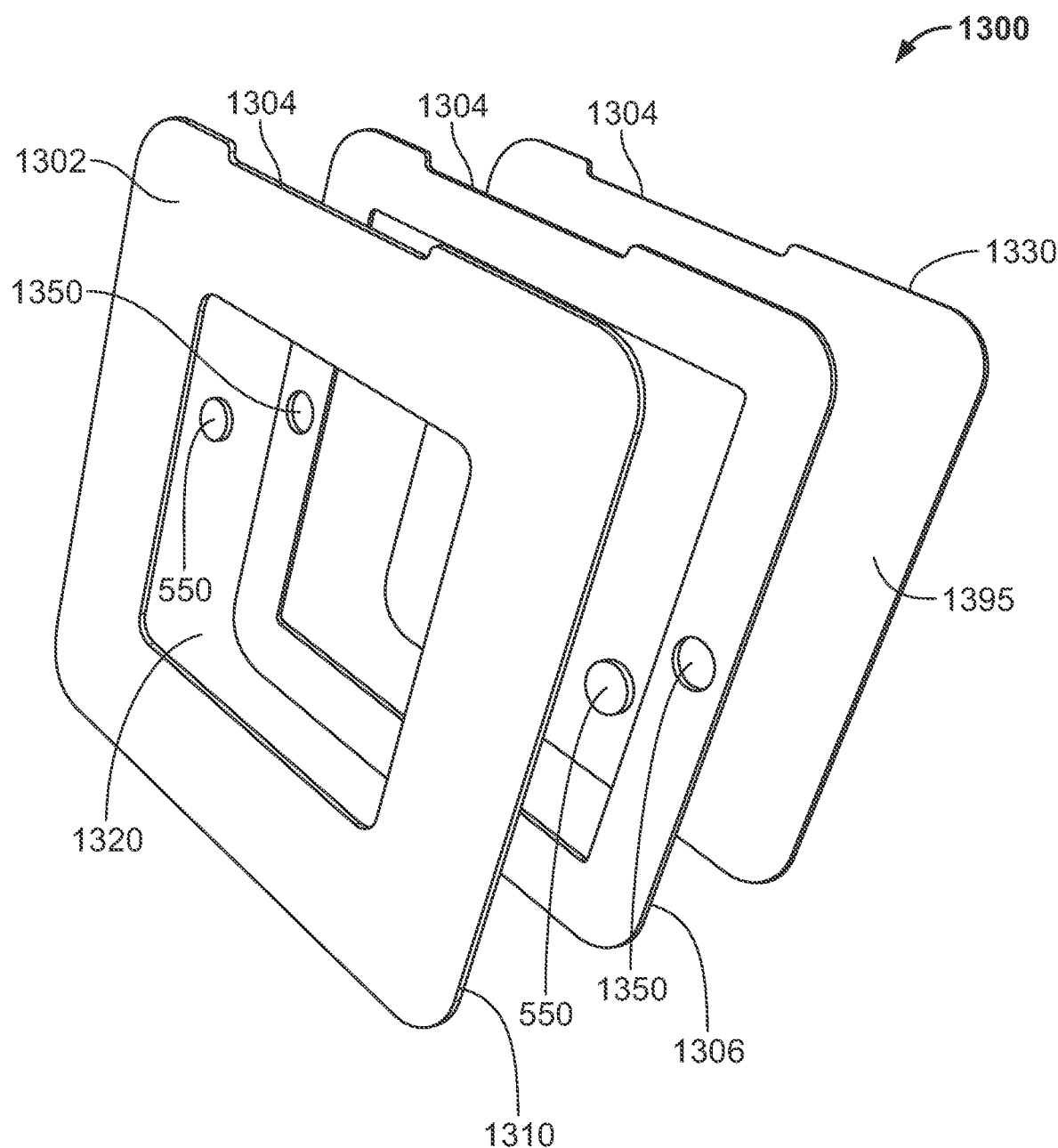
Figure 13B:
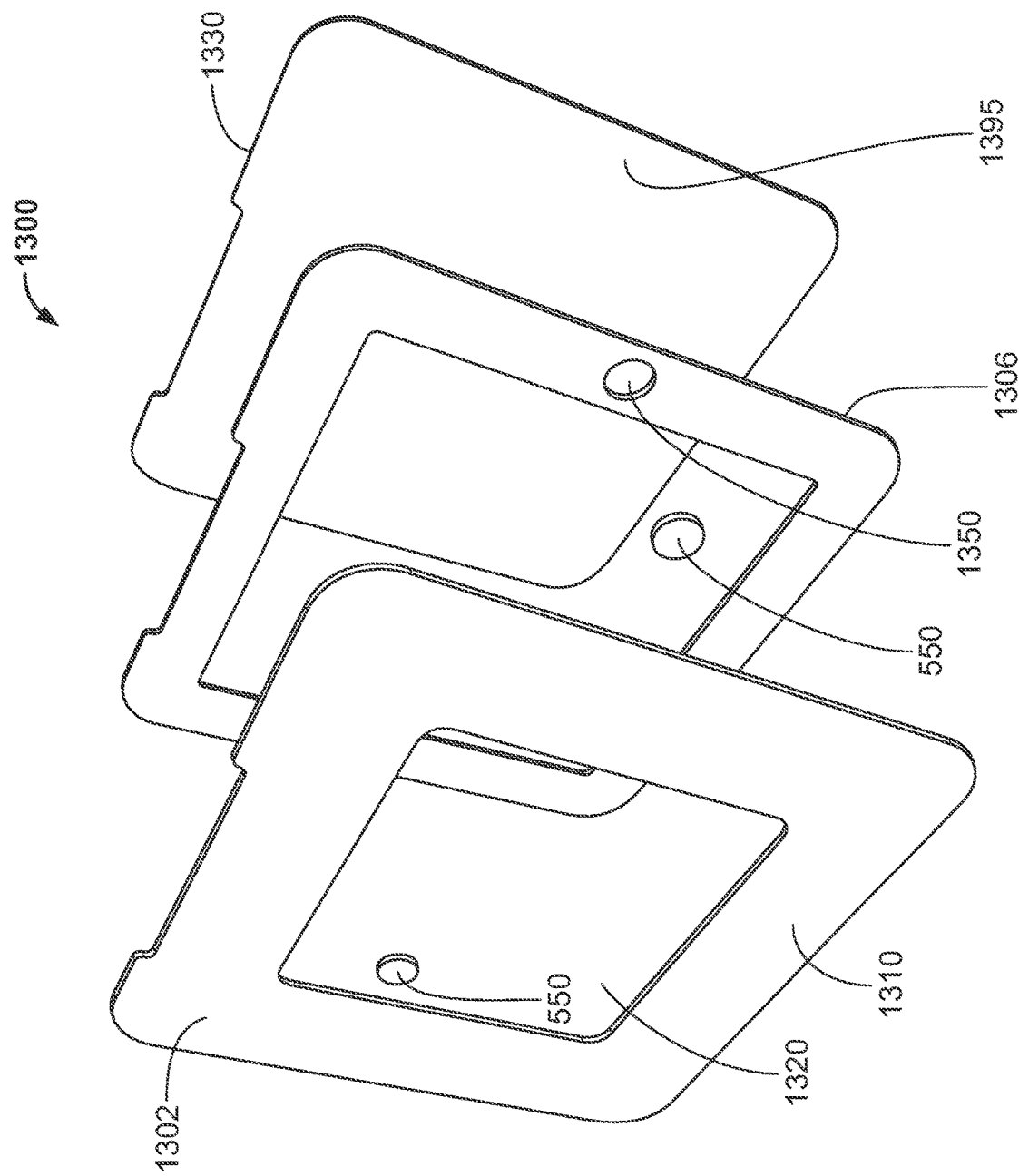
Figure 13C:
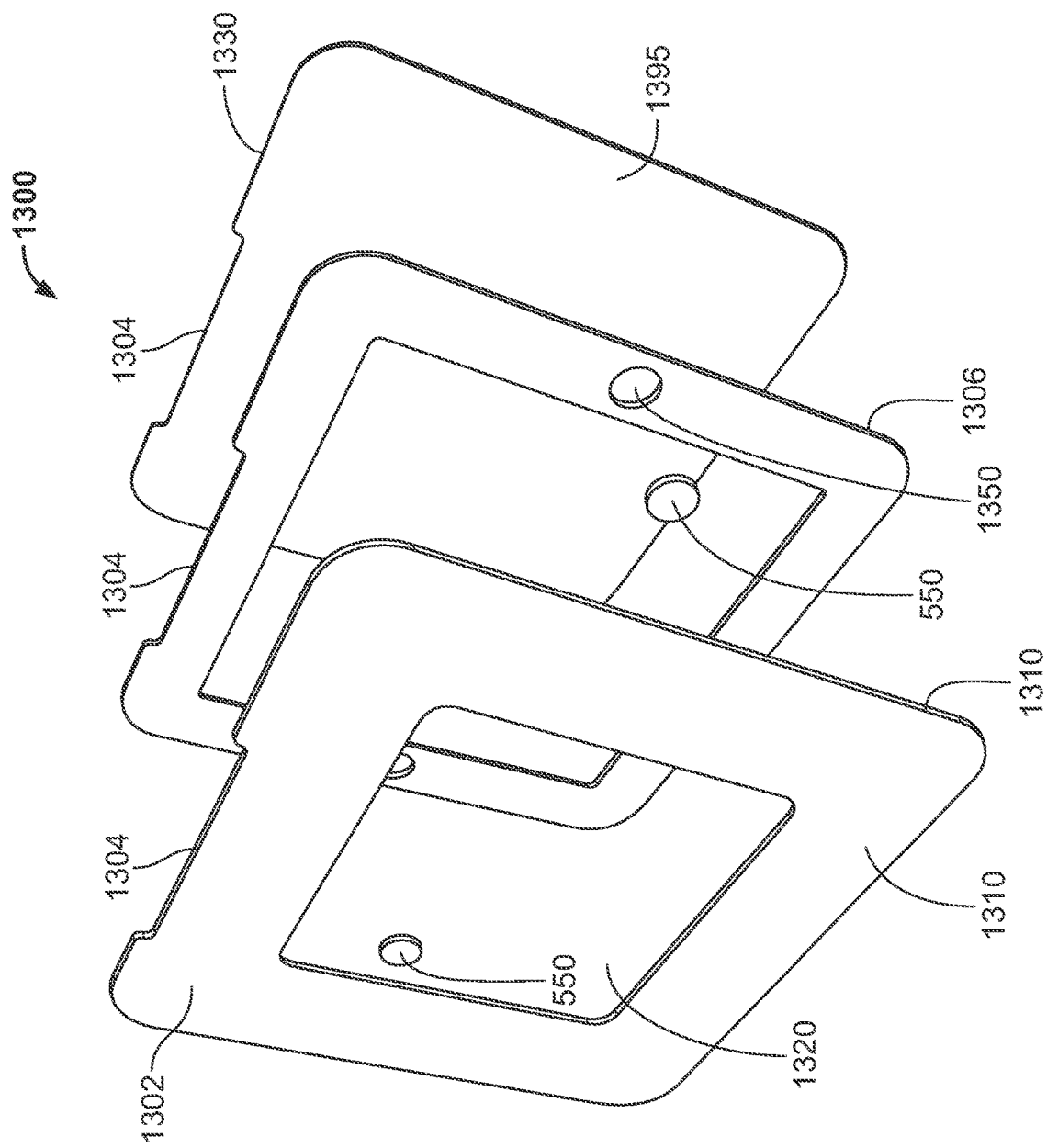
Figure 13D:
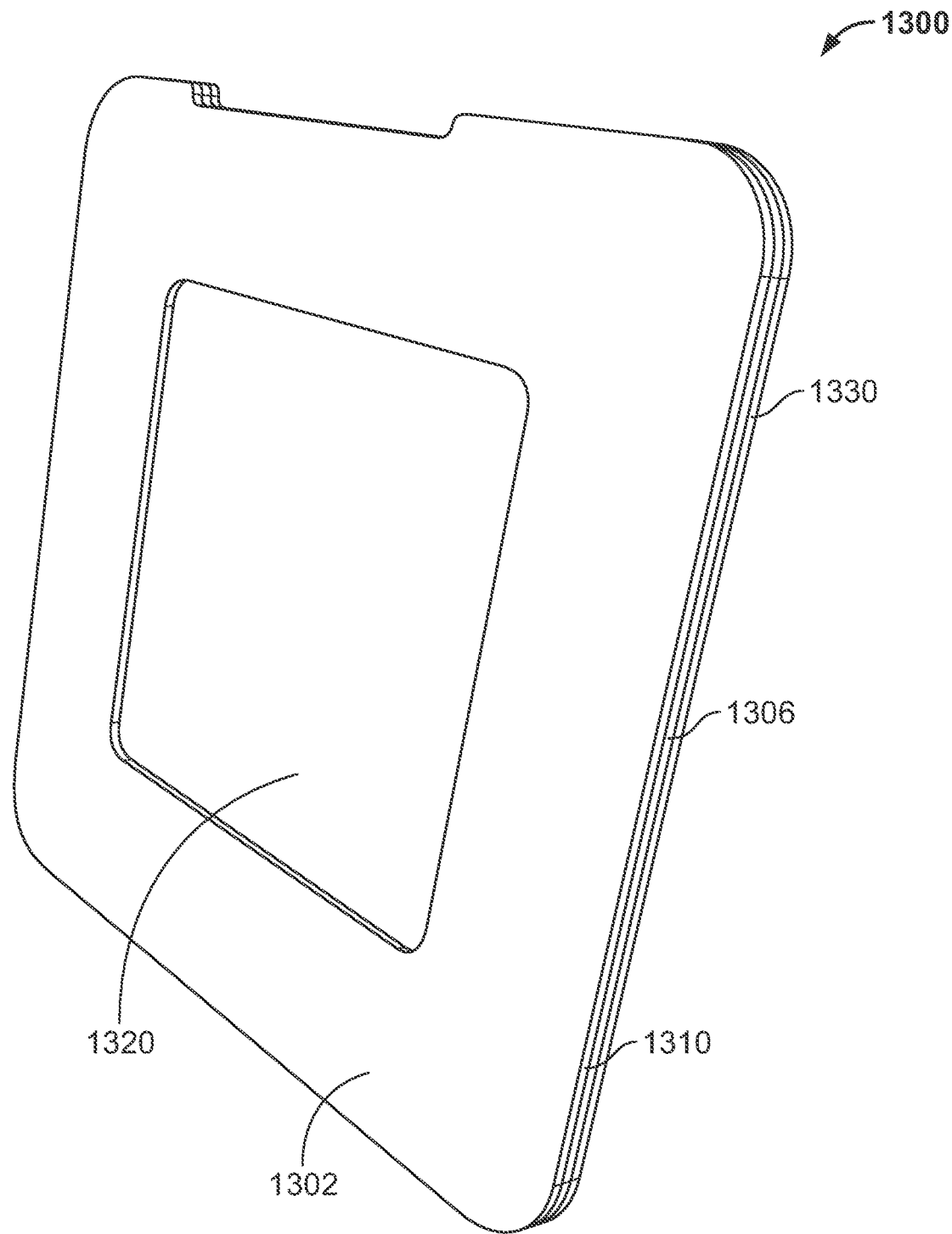
Figure 13G:
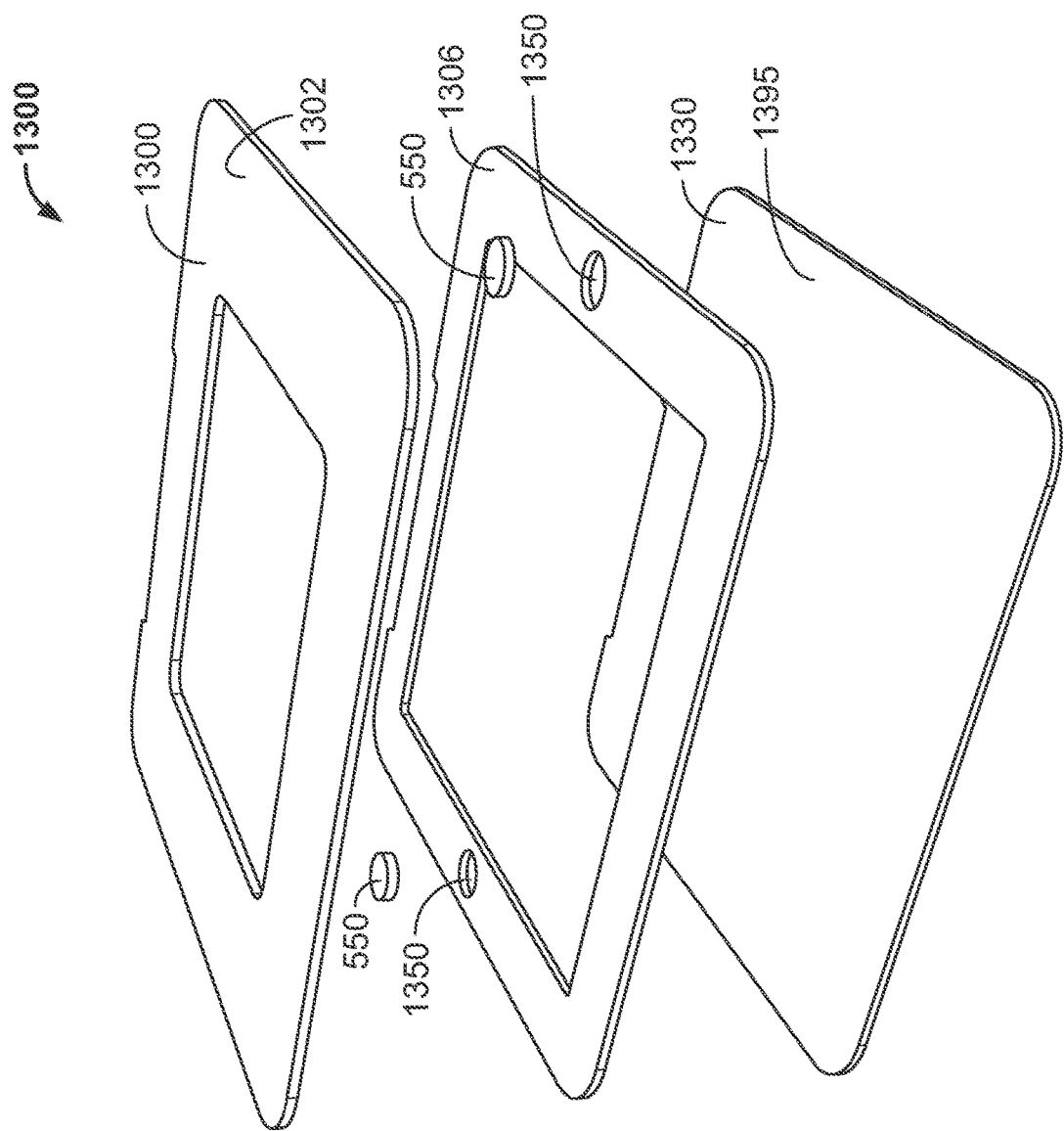

FIG. 13A illustrates a swatch presentation device 1300 that includes a front layer 1310, a frame 1306, and a back layer 1330. Front layer 1310 includes a front surface 1302 that encloses a front cavity 1320. The back side of front surface 1302 may include adhesive. Each of the front layer 1310, frame 1306, and back layer 1330 include coinciding recessed portions 1304 along coinciding sides. Frame 1306 includes two apertures 1350 on opposite sides. The apertures 1350 may each hold a magnet 550. Back layer 1330 includes a forward facing surface 1395 that may attach to a backward facing surface of frame 1306 with adhesive. FIGS. 13B and 13C illustrate alternate views of the swatch presentation device 1300. FIG. 13D illustrates swatch presentation device 1300 assembled. For example, each of front layer 1310 and back layer 1330 may be attached to frame 1306 with adhesive. FIG. 13E illustrates a side view of the assembled swatch presentation device 1330 of FIG. 13D. FIG. 13F illustrates yet another view of the assembled swatch presentation device 1330 of FIG. 13D. FIG. 13G illustrates a view of the swatch presentation device 1330 prior to assembly.

Figure 13I:
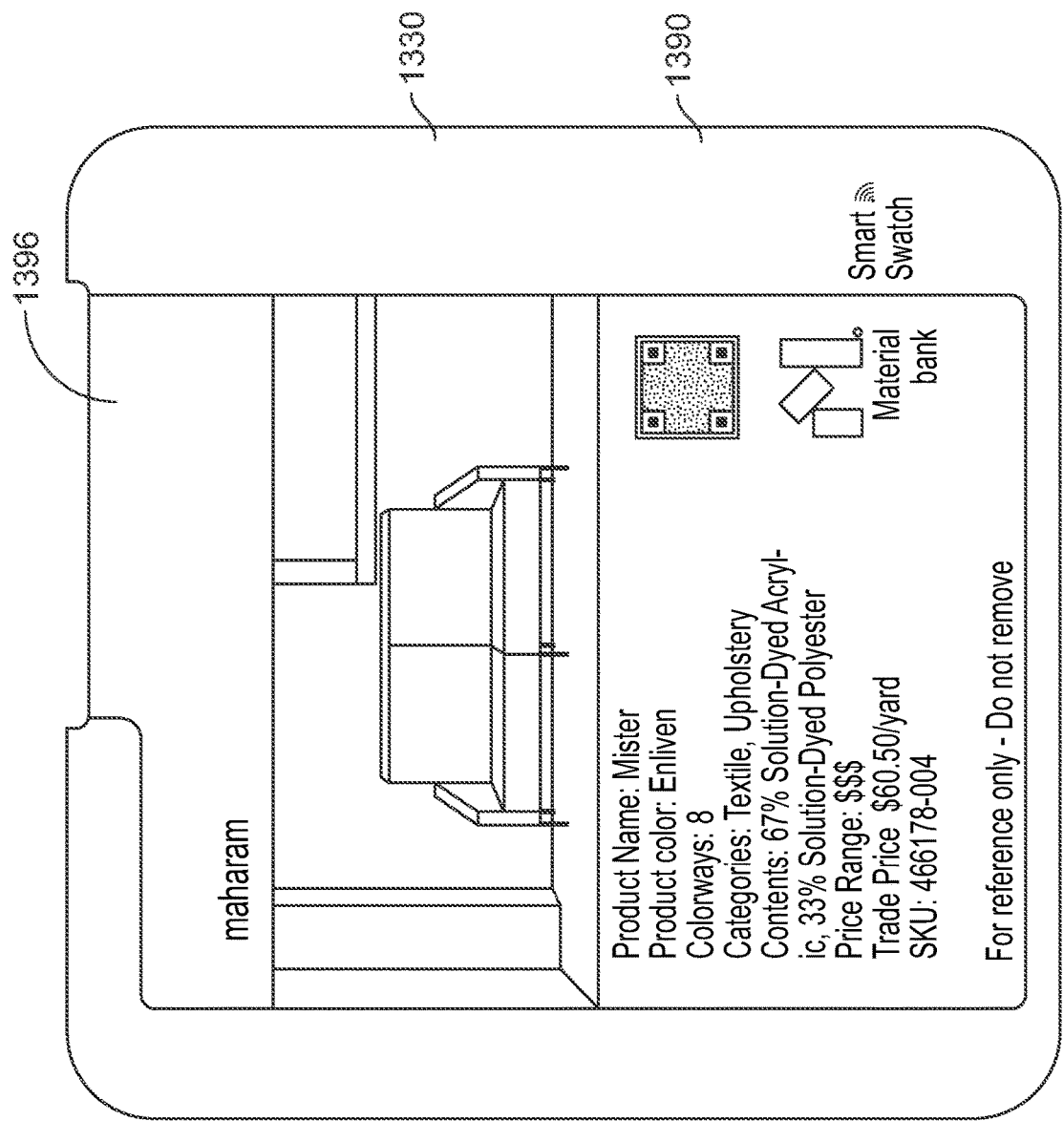

FIGS. 13H and 13I illustrate the assembled swatch presentation device 1300 with a swatch 130 displayed through the front cavity 1320 of front layer 1310 and a swatch presentation device sticker 1396 attached. Swatch presentation sticker 1396 may include adhesive and may be placed over a portion of front layer 1310, over each recess portion 1304 of the front layer 1310, frame 1306, and back layer 1330, and over a portion of the back surface 1390 of back layer 1330. Swatch presentation sticker 1396 may include a name or brand for the swatch 130 on the portion over front layer 1310, and may include additional swatch 130 details on the portion over the back layer 1330, for example. Swatch presentation sticker 1396 may also assist in holding front layer 1310, frame 1306, and back layer 1330 together by providing a compressing force along recessed portions 1304.

FIG. 11B illustrates a frame 1106 which may attach to the back side of front surface 1102 with the adhesive. Frame 1160 also includes two apertures 1150 opposite each other on two sides of frame 1160. Frame 1160 may also include adhesive on its back side. Frame 1160 may also include a recesses portion 1104 that coincides with the recessed portion 1104 of front layer 1110. FIG. 11C illustrates a backward facing surface 1190 of a back layer 1130 of the swatch presentation device 1100. A forward facing layer of the back layer 1130 may attach to frame 1160 with the adhesive on the back side of frame 1160. Back layer 1130 may also include a recessed portion 1104 that coincides with the recessed portions 1104 of front layer 1110 and frame 1160. In some examples, a sticker is placed over the recessed portions 1104, which may aid in holding the portions together.

Figure 14B:
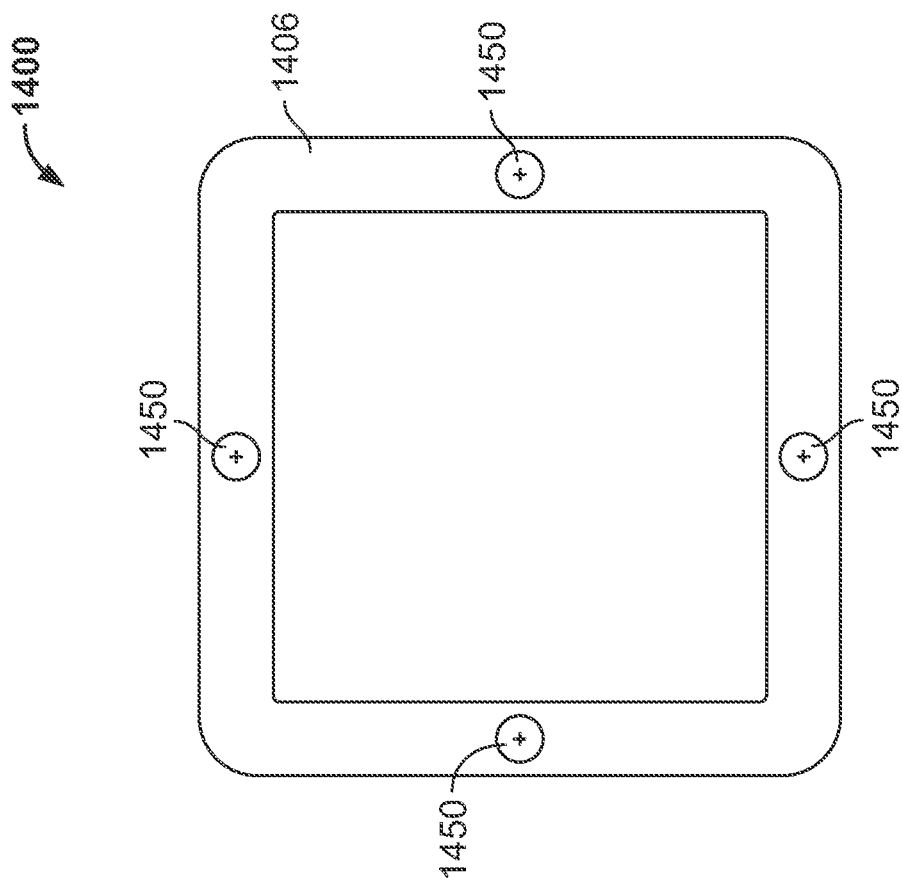
FIGS. 14A, 14B, 14C, and 14D illustrate various portions of yet another swatch presentation device in accordance with some embodiments.
Figure 14A:
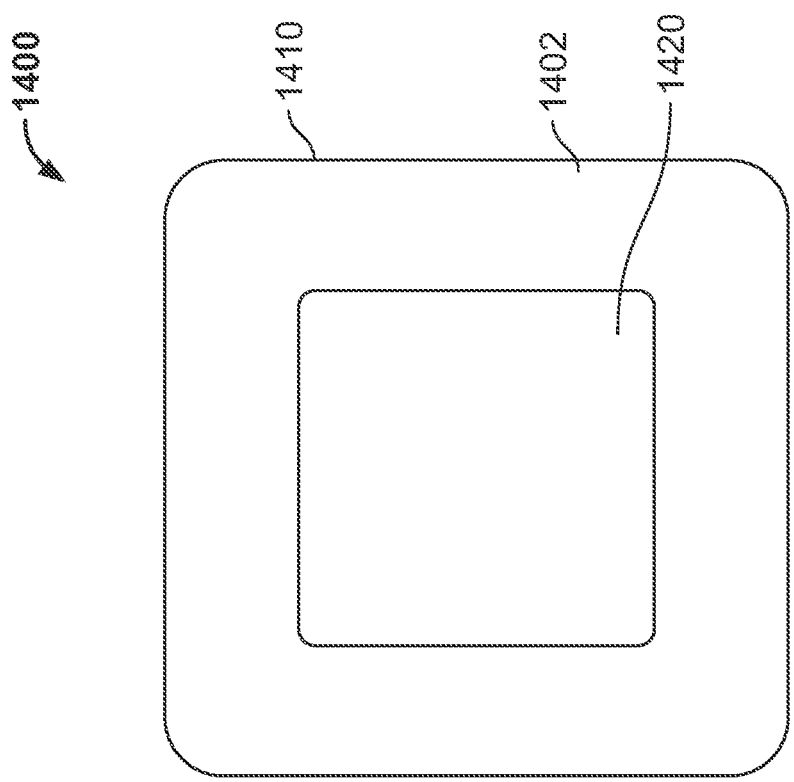
Figure 14C:
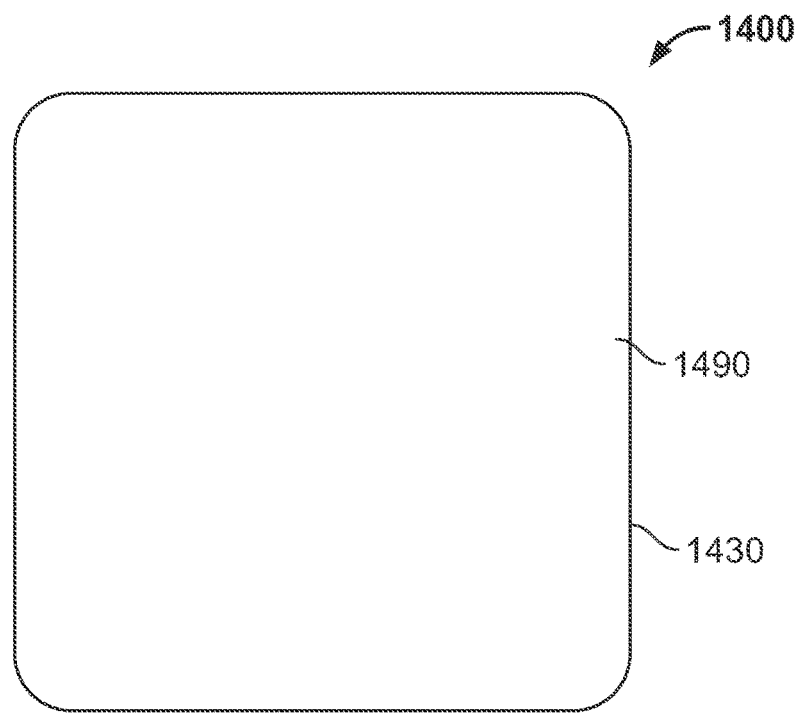
Figure 14D:
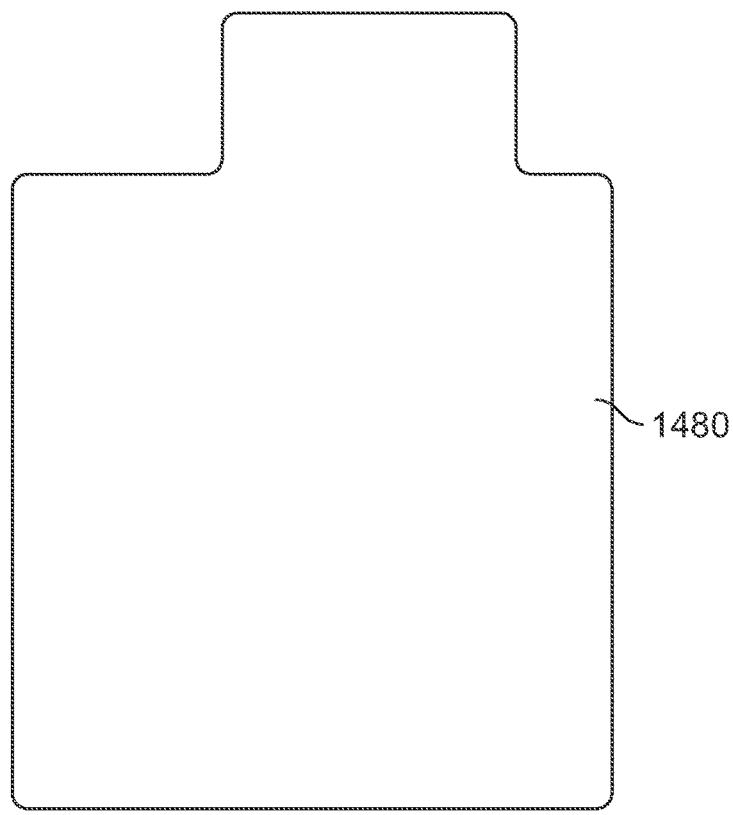
Figure 14D:
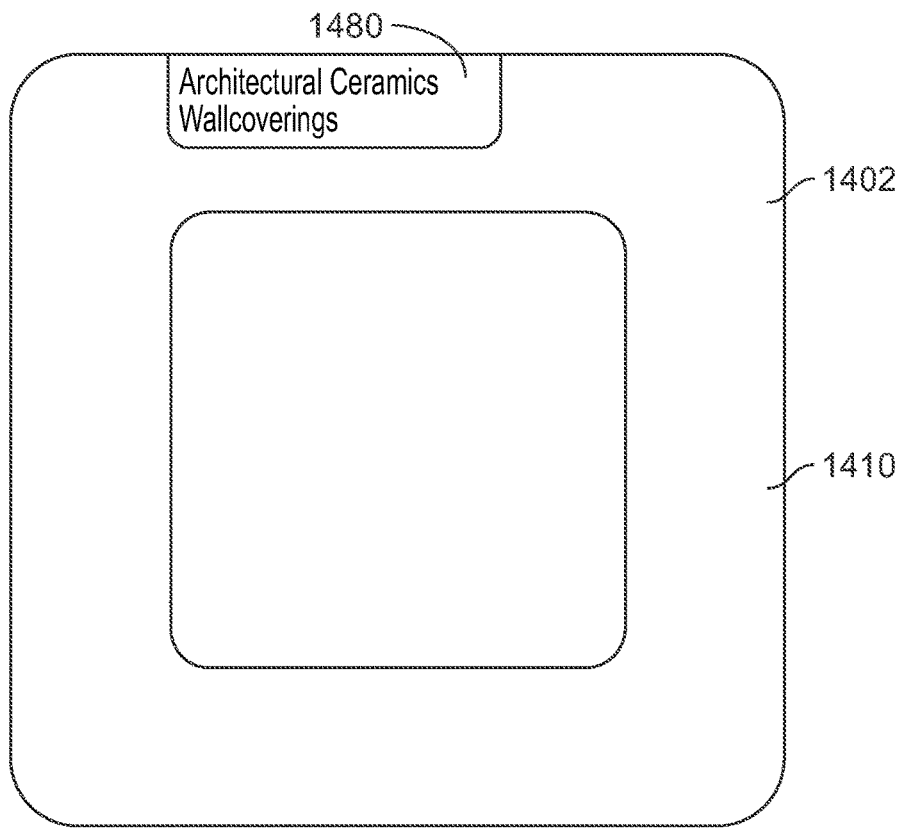
Figure 14D:
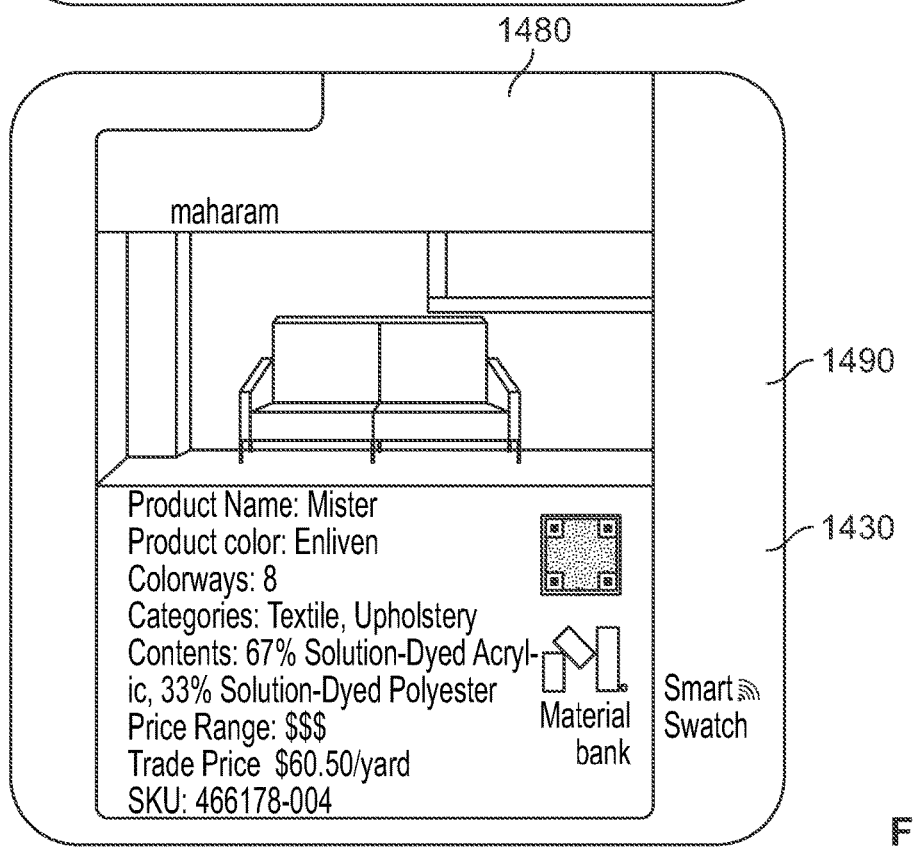

FIG. 14A illustrates a front layer 1410 that includes a front surface 1402 that encloses a front cavity 1420 of swatch presentation device 1400. The back side of front surface 1402 may include adhesive. FIG. 14B illustrates a frame 1406 which may attach to the back side of front surface 1402 with the adhesive. In this example, frame 1460 includes four apertures 1450 on each of four sides of frame 1460. Frame 1460 may also include adhesive on its back side. FIG. 14C illustrates a backward facing surface 1490 of a back layer 1430 of the swatch presentation device 1400. A forward facing layer of the back layer 1430 may attach to frame 1460 with the adhesive on the back side of frame 1460. FIG. 14D illustrates a swatch presentation device sticker 1480 that includes adhesive on one side. The swatch presentation device sticker 1480 may be placed over a portion of the front surface 1402 of front layer 1410, over an edge of each of the front layer 1410, frame 1406, and back layer 1430, and over a portion of the backward facing surface 1490 of a back layer 1430. The stick may include information, such as marketing or description information, of a swatch 130 that may be placed within swatch presentation device 1400.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A presentation device comprising:
   a first swatch display opening in a forward facing surface;
   a swatch securing system adapted for securing a swatch within the first swatch display opening;
   a second swatch display opening in a backward facing surface adapted for displaying identifying information regarding the swatch;
   a transmitter within a transmitter housing, wherein said transmitter is adapted for wireless transmission of data identifying the swatch;
   a first layer comprising the forward facing surface and the backward facing surface;
   a second layer comprising a forward facing surface configured to engage the backward facing surface of the first layer; and
   a third layer comprising a forward facing surface configured to engage the backward facing surface of the second layer,
   wherein at least one of the following is true:
   (i) the presentation device further comprises a frame, wherein the swatch is secured in the swatch securing system, wherein the swatch comprises a first surface and a second surface, and wherein the first surface engages the backward facing surface of the first layer; and the frame comprises a forward facing surface configured to engage at least a portion of the second surface of the swatch;
   (ii) the third layer comprises a third layer opening, and wherein the transmitter housing is located within the third layer opening; or
   (iii) the second layer includes a plurality of magnets located within a plurality of corresponding apertures.

2. The presentation device of claim 1, comprising the frame, wherein: the swatch secured in the swatch securing system, wherein the swatch comprises the first surface and the second surface, and wherein the first surface engages the backward facing surface of the first layer; and the frame comprises the forward facing surface configured to engage at least a portion of the second surface of the swatch.

3. The presentation device of claim 1, wherein the data identifying the swatch comprises a plurality of characteristics of the swatch secured in the swatch securing system.

4. The presentation device of claim 1 wherein the third layer comprises the third layer opening, and wherein the transmitter housing is located within the third layer opening.

5. The presentation device of claim 1, wherein the second layer includes the plurality of magnets located within the plurality of corresponding apertures.

6. The presentation device of claim 1, wherein the wireless transmission of data comprises at least one of manufacture information, material information, color information, and cleaning information.

7. A system comprising:
a presentation device comprising:
  a swatch;
  a swatch display opening in a forward facing surface;
  a swatch securing system adapted for securing the swatch within the swatch display opening;
  a second swatch display opening in a backward facing surface adapted for displaying identifying information regarding the swatch displayed in the presentation device; and
a transmitter within a transmitter housing, wherein said transmitter is adapted for wireless transmission of data identifying the swatch; and
a computing device configured to:
  receive the wireless transmission of data from the presentation device; and
  provide for display at least a portion of the wireless transmission of data, wherein at least one of the following is true:
    (a) the computing device is configured to access a database that includes a mapping of a plurality of presentation devices to a plurality of swatches; and determine the swatch within the swatch display opening based on the wireless transmission of data and the mapping, or
    (b) the data identifying the swatch comprises a plurality of characteristics of the swatch secured in the swatch securing system.

8. The system of claim 7, wherein the computing device is configured to: access the database that includes the mapping of the plurality of presentation devices to the plurality of swatches; and determine the swatch within the swatch display opening based on the wireless transmission of data and the mapping.

9. The system of claim 7, wherein the presentation device comprises:
  a first layer comprising the forward facing surface and a backward facing surface;
  a second layer comprising a forward facing surface configured to engage the backward facing surface of the first layer; and
  a third layer comprising a forward facing surface configured to engage the backward facing surface of the second layer.

10. The system of claim 9, wherein the swatch comprises a first surface and a second surface, wherein the first surface engages the backward facing surface of the first layer.

11. The system of claim 10, wherein the presentation device comprises a frame, wherein the frame comprises a forward facing surface configured to engage at least a portion of the second surface of the swatch.

12. The system of claim 7, wherein the data identifying the swatch comprises the plurality of characteristics of the swatch secured in the swatch securing system.

13. The system of claim 9, wherein the third layer of the presentation device comprises a third layer opening, and wherein the transmitter housing is located within the third layer opening.

14. The system of claim 9, wherein the second layer of the presentation device includes a plurality of magnets located within a plurality of corresponding apertures.

15. A system comprising:
a presentation device comprising:
  a swatch;
  a swatch display opening in a forward facing surface;
  a swatch securing system adapted for securing the swatch within the swatch display opening;
  a second swatch display opening in a backward facing surface adapted for displaying identifying information regarding the swatch displayed in the presentation device;
  a first layer comprising the forward facing surface and a backward facing surface;
  a second layer comprising a forward facing surface configured to engage the backward facing surface of the first layer;
  a third layer comprising a forward facing surface configured to engage the backward facing surface of the second layer; and
  a transmitter within a transmitter housing, wherein said transmitter is adapted for wireless transmission of data identifying the swatch; and
a computing device configured to:
  receive the wireless transmission of data from the presentation device; and
  provide for display at least a portion of the wireless transmission of data,
wherein at least one of the following is true:
  (I) the data identifying the swatch comprises a plurality of characteristics of the swatch secured in the swatch securing system;
  (II) the third layer of the presentation device comprises a third layer opening, and wherein the transmitter housing is located within the third layer opening; or
  (III) the second layer of the presentation device includes a plurality of magnets located within a plurality of corresponding apertures.

16. The system of claim 15, wherein the data identifying the swatch comprises the plurality of characteristics of the swatch secured in the swatch securing system.

17. The system of claim 15 wherein the third layer of the presentation device comprises the third layer opening, and wherein the transmitter housing is located within the third layer opening.

18. The system of claim 15 wherein the second layer of the presentation device includes the plurality of magnets located within the plurality of corresponding apertures.

* * * * *